US009473566B2

(12) United States Patent
Stockhammer et al.

(10) Patent No.: US 9,473,566 B2
(45) Date of Patent: Oct. 18, 2016

(54) DELIVERING SERVICES USING DIFFERENT DELIVERY METHODS

(71) Applicant: QUALCOMM Incorporated, San Diego, CA (US)

(72) Inventors: Thomas Stockhammer, Bergen (DE); Charles Nung Lo, San Diego, CA (US); Carlos Marcelo Dias Pazos, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 14/302,502

(22) Filed: Jun. 12, 2014

(65) Prior Publication Data

US 2015/0081838 A1    Mar. 19, 2015

Related U.S. Application Data

(60) Provisional application No. 61/877,964, filed on Sep. 14, 2013, provisional application No. 61/881,625, filed on Sep. 24, 2013.

(51) Int. Cl.
| | |
|---|---|
| *G06F 15/16* | (2006.01) |
| *H04L 29/08* | (2006.01) |
| *H04L 29/06* | (2006.01) |
| *H04W 4/06* | (2009.01) |

(52) U.S. Cl.
CPC .......... *H04L 67/10* (2013.01); *H04L 65/4076* (2013.01); *H04L 65/608* (2013.01); *H04L 67/16* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 2007/0100981 A1* | 5/2007 | Adamczyk | H04L 69/18 709/223 |
| 2008/0318558 A1 | 12/2008 | Bouazizi et al. | |
| 2012/0170502 A1* | 7/2012 | Korus | H04W 4/06 370/312 |
| 2012/0263089 A1 | 10/2012 | Gupta et al. | |
| 2013/0007814 A1 | 1/2013 | Cherian et al. | |
| 2013/0182643 A1 | 7/2013 | Pazos et al. | |
| 2013/0242738 A1* | 9/2013 | Chang | H04W 4/06 370/235 |
| 2013/0294321 A1 | 11/2013 | Wang et al. | |
| 2014/0033242 A1* | 1/2014 | Rao | H04N 21/442 725/14 |

(Continued)

OTHER PUBLICATIONS

Anonymous., "Transmission Control Protocol", Apr. 21, 2013 (Apr. 21, 2013 ), XP055134900, Retrieved from the Internet: URL:http://en.wikipedia.org/w/index.php? title= Transmission_Control_Protocol&oldid=551476932 retrieved on Aug. 15, 2014].

(Continued)

*Primary Examiner* — Brian P Whipple
(74) *Attorney, Agent, or Firm* — The Marbury Law Group, PLLC

(57) ABSTRACT

Systems, methods, and devices of the various embodiments enable objects associated with a service available in a MBMS network to be delivered through more than one delivery method or context. In various embodiments, an application service document may map objects of a service to their respective delivery methods or contexts. In an embodiment, an application service document may also identify service area restrictions applicable to an object. In an embodiment, an application service document may further identify group restrictions applicable to an object. In a further embodiment, the application service document may identify identical and alternative objects that are available.

48 Claims, 10 Drawing Sheets

(56) References Cited

U.S. PATENT DOCUMENTS

2014/0372624 A1* 12/2014 Wang .................... H04L 65/60
709/231
2015/0063193 A1* 3/2015 Veerepalli ............. H04W 48/16
370/312

OTHER PUBLICATIONS

"3rd Generation Partnership Project; Technical Specification Group Services and System Aspects; Multimedia Broadcast/Multicast Service (MBMS); Protocols and codecs (Release 11)", 3GPP Standard; 3GPP TS 26.346, 3rd Generation Partnership Project (3GPP), Mobile Competence Centre; 650, Route Des Lucioles; F-06921 Sophia-Antipolis Cedex; France, vol. SA WG4, No. V11.5.0, XP050711743, Jun. 3, 2013 (Jun. 3, 2013), pp. 1-168.
International Search Report and Written Opinion—PCT/US2014/055524—ISA/EPO—Dec. 22, 2014.

Qualcomm Incorporated: "USD Signaling of DASH Transport", 3GPP Draft; S4-130390 USD Signaling of DASH Transport, 3rd Generation Partnership Project (3GPP), Mobile Competence Centre, 650, Route Des Lucioles, F-06921 Sophia-Antipolis Cedex, France, vol. SA WG4, no. Qingdao, China; XP050710402, Retrieved from the Internet: URL:http://www.3gpp.org/ftp/tsg_sa/WG4_CODEC/TSGS4 73/Docs/, Apr. 15, 2013-Apr. 19, 2013 Apr. 10, 2013 (Apr. 10, 2013), 8 pages.
Qualcomm Incorporated: "Draft CR on USD Indication of DASH Representation Transport Mode", 3GPP Draft; S4-130052 Draft CR 26 346 USD Indication of DASH Representation Transport Mode, 3rd Generation Partnership Project (3GPP), Mobile Competence Centre; 650, Route Des Lucioles ; F-06921 SOPH, vol. SA WG4, no. Valencia, Spain; Jan. 28, 2013-Feb. 1, 2013, Retrieved from the Internet: URL:http://www.3gpp.org/ftp/tsg_sa/WG4_CODEC/TSGS4 72/Docs/, XP050687450, Jan. 23, 2013 (Jan. 23, 2013).
Co-pending U.S. Appl. No. 14/153,888, filed Jan. 13, 2014.
Co-pending U.S. Appl. No. 14/264,132, filed Apr. 29, 2014.
Co-pending U.S. Appl. No. 14/305,557, filed Jun. 16, 2014 (unpublished).

* cited by examiner

DELIVERING SERVICES USING DIFFERENT DELIVERY METHODS

RELATED APPLICATIONS

This application claims the benefit of priority to U.S. Provisional Patent Application No. 61/877,964 entitled "DASH Media Presentation Over A Combined MBMS Unicast and Broadcast Service" filed Sep. 14, 2013 and to U.S. Provisional Patent Application No. 61/881,625 entitled "DASH Media Presentation Over A Combined MBMS Unicast and Broadcast Service" filed Sep. 24, 2013. The entire contents of both applications are hereby incorporated by reference.

BACKGROUND

In current Multimedia Broadcast/Multicast Service (MBMS) networks different objects associated with a service may be available via different delivery methods, such as unicast delivery, MBMS download delivery, etc. However, in current MBMS networks, no single document signals the different delivery methods for an object. This lack of a single source of delivery method information presents challenges in providing continuous services in current MBMS networks.

SUMMARY

The systems, methods, and devices of the various embodiments enable objects associated with a service available in a MBMS network to be delivered through more than one delivery method/context. In various embodiments, an application service document may map objects of a service to their respective delivery methods/contexts. In an embodiment, an application service document may also identify service area restrictions applicable to an object. In an embodiment, an application service document may further identify group restrictions applicable to an object. In a further embodiment, the application service document may identify identical and alternative objects that are available.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
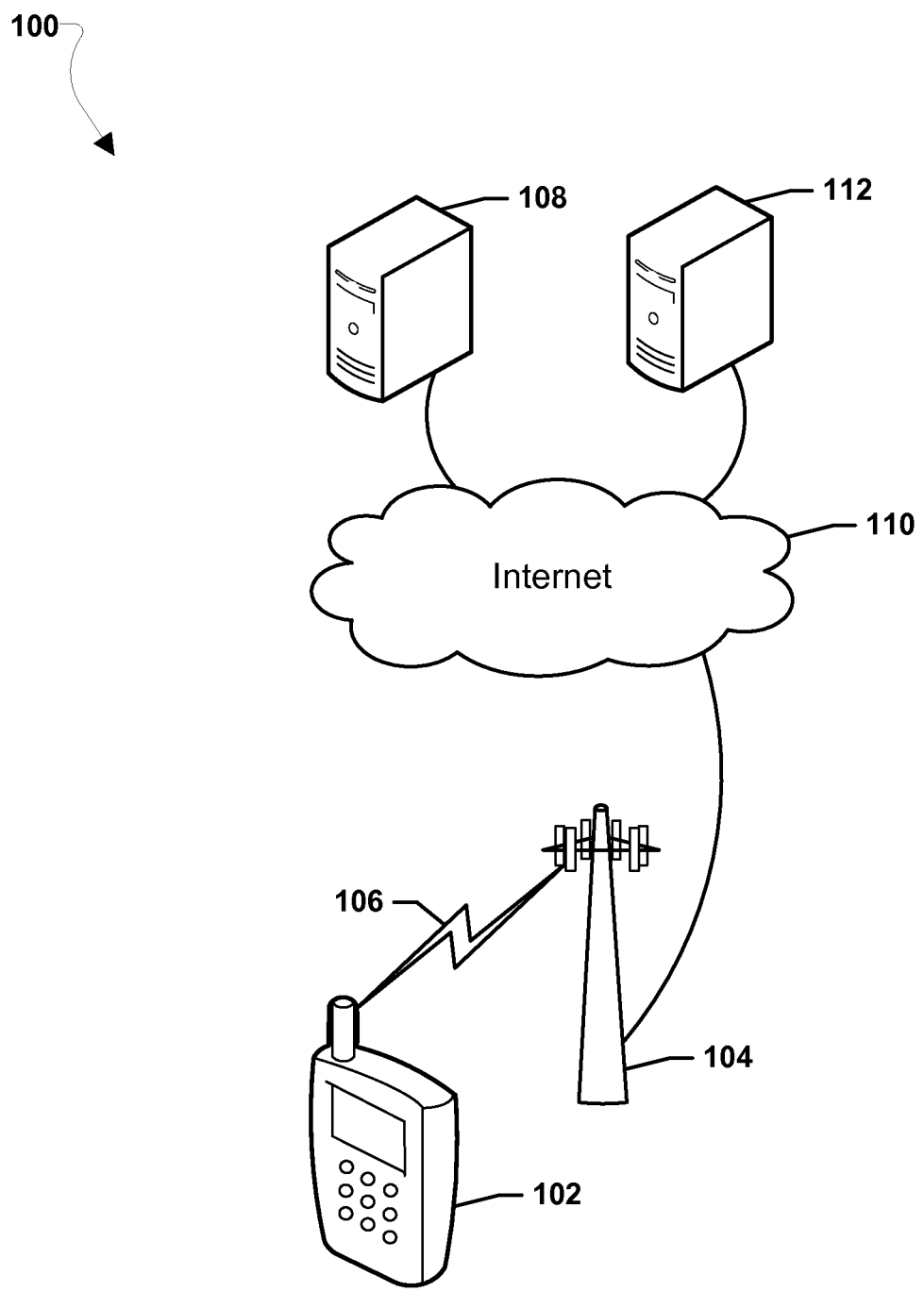
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, set top boxes, smart books, palm-top computers, wireless electronic mail receivers, multimedia Internet enabled cellular telephones, wireless gaming controllers, and similar personal electronic devices which include a programmable processor and memory and circuitry for receiving broadcast services.

The various embodiments are described herein using the term "server." The term "server" is used to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on mobile devices. A light server or secondary server may be a slimmed-down version of server type functionality that can be implemented on a mobile device thereby enabling it to function as an Internet server (e.g., an enterprise e-mail server) only to the extent necessary to provide the functionality described herein.

In current Dynamic Adaptive Streaming over HTTP (DASH) delivery over MBMS (as described in section 5.6 of 3GPP TS 26.346) a User Service Description (USD) metadata fragment (e.g., a MBMS USD) for a service contains a mediaPresentationDescription element referencing a media presentation description (MPD), which could also be described as a metadata fragment describing the DASH service. However, in current DASH delivery over MBMS (as described in section 5.6 of 3GPP TS 26.346), the usage of the mediaPresentationDescription element is restricted as all resources referenced in the MPD must be delivered through a single download delivery session. These restrictions present challenges in providing continuous services in current MBMS networks.

The systems, methods, and devices of the various embodiments enable one or more objects associated with a service available in a MBMS network to be delivered through more than one delivery method. In various embodiments, an application service document may map objects of a service to their respective delivery methods. An application service document may be a data structure component of a service (e.g., an MBMS service) announcement and discovery information that provides metadata related to the objects of an associated application service, including, but not limited to, the delivery context, the delivery method, object access information, object characteristics, etc. An object may be any structure delivered as part of a service, including segments, images, style sheets, MPD updates, etc. In an embodiment, an object may correspond to service announcement and discovery information for an application service. In an embodiment, an application service document may also identify service area restrictions applicable to an object. In an embodiment, an application service document may further identify group restrictions applicable to an object. In a further embodiment, the application service document may identify identical and alternative objects that are available.

The various embodiments discussed herein may be applicable to the delivery of any object associated with any application service available in MBMS networks, examples of which include objects associated with DASH services, Apple® HTTP Live Streaming services, HTML pages, etc. However, while the various embodiments and examples are discussed herein as using DASH, Apple® HTTP Live Streaming, and HTML pages as example application services, the discussions of DASH, Apple® HTTP Live Streaming, and HTML pages are used merely as examples to better illustrate the aspects of the various embodiments, and are not intended to limit the claims. Other application services, such as any application service having associated objects for delivery in MBMS networks, may be used with the various embodiments, and the services and their associated objects may be substituted in the various examples and embodiments without departing from the spirit or scope of the invention.

In an embodiment, application service documents may be generated in any format and may be applicable to different application services, including as general application service documents not specific to any one protocol (e.g., any one of the collective of MBMS User Service Announcement and Discovery metadata fragments (referred to in short as the USD or MBMS USD), a standalone document, etc.), as DASH specific application service documents (e.g., an MPD, etc.), as an HTML page with linked objects, an Apple® HTTP Live Streaming specific application service document (e.g., a M3U8 file), or any other type document.

In an embodiment, objects or content components of an application service may be delivered through one or more delivery contexts, including: 1) as a USD metadata fragment; 2) as content items or media components via broadcast delivery over a File Delivery Over Unidirectional Transport (FLUTE) session; and 3) as content items or media components via HTTP unicast delivery. As an example, the application service may comprise media streams delivered: a) through multiple FLUTE sessions; or b) through HTTP unicast. Alternatively, the content components of the associated application service may correspond to service announcement data carried in a separate USD metadata fragment. MBMS middleware running on a processor of a receiver device may receive the application service document associated with the application service. Based at least in part on the information in the application service document, and optional other information such as coverage and service area information or group information, the MBMS middleware running on the processor of the receiver device select a delivery method for the objects of the application service.

In an embodiment, the USD may be extended with a general application service fragment that describes the mapping of the different objects or collections of objects of the application service to the different delivery methods. In an embodiment, identical and alternative content that may be available through broadcast and unicast may be identified in the application service fragment. In this manner, based on the information in the application service fragment an MBMS client may support an application client by enforcing switching between unicast and broadcast as coverage changes occur to enable continuous provisioning of application service objects to the application client. In another embodiment, the delivery method child element of the USD may be extended to describe the mapping of the different objects or collections of objects of the application service to the different delivery methods, and identical and alternative content that may be available through broadcast and unicast may be identified in a separate application service fragment.

In the various embodiments, the application service and the MBMS delivery may be separated by a simple caching model. This design may enable existing features of application services, such as DASH or Apple® HTTP Live Streaming, over MBMS service, and enable support of delivery for unicast and multicast delivered objects for the same media presentation. However, the application client, such as the DASH client or Apple® HTTP Live Streaming, may not need to handle any MBMS operations because the MBMS operations may be handled by the MBMS client.

In an embodiment, an application service including multiple different objects may be included within a Broadcast Multicast Service Center (BMSC). Based on rules, the objects of the application service may be distributed and made available through a download delivery session defined in the USD, through unicast, or as a metadata fragment component of the USD where the USD may be delivered over broadcast or unicast. The distribution of the different objects via different delivery contexts, as well as the scheduling of the objects, may be controlled by content and service providers. The delivery methods and scheduling may be based on various factors, including available bandwidth on a MBMS download delivery session, an expected popularity of the content, the dynamics of the content, etc. In an embodiment, the BMSC may generate an application service document, such as an application service fragment appended to the USD, including information about the objects of the application service, such as types of the objects, the delivery contexts for the objects, coverage and service area information, identical and alternative content indications, reference to session description information, etc. The BMSC may send the application service document to an MBMS client of a receiver device.

In an embodiment, the MBMS client of the receiver device may receive the application service document, for example by parsing the application service fragment included in the received USD. In an embodiment, the application service document may reference an application service entry point and describe the type of the application service to enable the MBMS client to select the appropriate handler. For example, when the type of the application service is indicated as DASH in the application service document, the application service entry point document may be an MPD and the MBMS client may provide the DASH client an MPD. The MBMS client may also parse the application service fragment to identify the different delivery methods/contexts and session description information for accessing the different pieces of the content.

Objects delivered through FLUTE sessions may typically be made available on a receiver device through a cache/server service operating on the receiver device. In an embodiment, a proxy operating on the receiver device may route requests for objects associated with an application service based on information in the application service document. In an embodiment, objects, such as static timeless data, may be delivered through metadata fragments in the USD, and these objects may also be made available at the local cache/server operating on the receiver device. In another embodiment, the caching of objects may occur in an application cache. In an embodiment, a FLUTE session of interest may be joined in a proactive manner before objects are requested. In another embodiment, a FLUTE session of interest may be joined only once objects that are delivered through the FLUTE session are requested.

In an embodiment, an MBMS USD may include at most one application service document instance (e.g., represented by an "ApplicationService" child element of the "userServiceDescription" element). The application service document may provide a location reference to an application service entry point document (e.g., a URI for an MPD fragment for a DASH media presentation, a URI an HTML page, a URI an Apple® HTTP Live Streaming M3U8 play list, etc.). The application service entry point document may reference additional objects via Uniform Resource Identifiers (URIs). In an embodiment, the inclusion of an application service document, such as an application service "ApplicationService" element, in the MBMS USD may indicate that all resources that are directly or indirectly referenced in the application service entry point document are delivered by one of the following: 1) via broadcast on one or more download delivery sessions defined in the USD; 2) as another metadata fragment in the USD; or 3) through HTTP unicast.

In an embodiment, an application service document (e.g., an "ApplicationService" element in the USD), may include a content location attribute (e.g., "@contentLocation") specifying the reference to the application service entry point document. Optionally, the application service document may include a content type attribute (e.g., "@contentType") specifying the MIME type of the application service entry point. Inclusion of MIME type indication may enable the handler of the content to be specified and may provide information to the handler enabling the handler to determine whether the associated content may be consumed.

Optionally, the application service document may include one or more delivery method/context elements (e.g., "DeliveryMethodMapping") specifying how different objects or collections of objects of the application service may be delivered within the MBMS user service.

Optionally, each delivery method/context element may include a type of delivery attribute (e.g., "@type") indicating a code defining the context of delivery of the associated objects of that application service. As examples, a code "0" may indicate unicast delivery of media components of the service, a code "1" may indicate that the associated objects belong to a metadata fragment delivered by nominal USD delivery methods (e.g., unicast and/or broadcast), code "2" may indicate broadcast delivery through one or more instances of the MBMS download delivery method defined in the USD itself, and other codes may indicate other delivery methods/contexts, such as enhanced FLUTE delivery, etc. A reference attribute in the delivery method/context element (e.g., "@reference") may specify a reference to the delivery service. For example, the reference attribute may include one or more references to the Session Description fragment(s) of the corresponding FLUTE session(s) over which the objects of the application service are carried when the type of delivery attribute indicates MBMS download delivery. The reference attribute may be mandatory when the type of delivery attribute indicates broadcast delivery (e.g., where the "@reference" points to the SDP for the broadcast FLUTE), but otherwise the reference attribute may be optional.

Optionally, each delivery method/context element may include a service area restriction attribute (e.g., "@serviceArea") that when present specifies that the referred to objects are delivered only in a restricted service area or areas. For example, when the type of delivery attribute indicates MBMS download delivery the service area restriction attribute may denote the restricted MBMS service area or areas corresponding to the MBMS Service Area Identity that the objects will be delivered in.

Optionally, each delivery method/context element may include one or more delivery URL regular expression pattern element (e.g., "URL/RegexPattern") that may list all base URLs/regular expression patterns that map to the objects that are delivered through the delivery method/context.

Optionally, each delivery method/content element may include a group attribute (e.g., @Group) indicating the group or groups associated with the referred to objects. A group may be a collection of user accounts or devices, and a receiver device may identify whether the receiver device and/or user of the receiver device is a member of a group based on group information stored in a memory of the receiver device. The group attribute may be a group restriction that when present specifies that the referred to objects are delivered only to members of the indicated group or groups. Group attributes may be used to control the delivery method for different groups. For example, at a sporting event receiver devices of home team fans may be associated with a first group and receiver devices of away team fans may be associated with a second group. The group attribute for a broadcast delivery method may indicate the first group while the group attribute for a unicast delivery method may indicate the second group. In this manner, broadcast resources may be dedicated to the likely larger number of home team fan receiver devices and unicast resources may be dedicated to the likely smaller number of away team fan receiver devices present at the sporting event. Additionally, different objects, such as different commercials, may be made available to the different groups based on the group attributes associated with the referred to objects. For example, at a sporting event receiver devices of home team fans may be associated with a first group and receiver devices of away team fans may be associated with a second group and both groups may be allowed to receive the on field coverage during normal game play. However, at a commercial break, different commercials may be made available to the first group and the second group, and the receiver devices may select their respective commercials based on their group association and the indicated group attribute for each commercial.

Optionally, the application service document may include one or more identical content elements (e.g., "Identical") specifying a list of base URLs that host identical content. Identical objects or content are objects or content that are exactly substitutable for the objects or content associated an application service entry point. For example, segments of a DASH presentation encoded at the exact same quality level and covering the exact same time period but available from different sources may be identical to each other. URL elements included in the identical content element may be exchanged and provide the identical content.

Optionally, the application service document may include one or more alternative content elements (e.g., "Alternative") specifying a list of base URLs that host alternative content. Alternative objects or content are objects or content that are substitutable for the objects or content associated an application service entry point resulting change in output or requiring additional processing. For example, segments of a DASH presentation encoded at a lower quality level or covering different time periods may be alternatives to an object or content referenced in an MPD because while the lower quality level or different time period segments may still be useable by a DASH player, the use of the lower quality level or different time period segments may result in a change in play out or processing of the segments when compared with the object or content referenced in the MPD. Alternative objects or content may be provided in the absence of the object associated with the application service entry point. URL elements included in the alternative content element may be exchanged and provide the alternative content.

In an embodiment, when a USD includes an application service document (e.g., an application service fragment), all resources that are directly or indirectly referenced in the application service entry point specified by the content location attribute (e.g., "@contentLocation") may be deliverable through at least one of the delivery methods/contexts defined in the delivery method/context elements (e.g., "deliveryMethodMapping"). In an embodiment, the USD including the application service document (e.g., an application service fragment) may include a metadata fragment that carries the application service entry point. For example, the metadata fragment may carry the application service entry point as a "@metadataURI" attribute in the metadata fragment for the delivered object that matches the referenced URL in the content location attribute. As another example, the metadata fragment may carry the application service entry point as a valid from/until window (e.g., "@validFrom" to "@validUntil" window) in the metadata fragment such that it covers the availability window of the object for the application service.

In an embodiment, for each delivery method/context element indicating a unicast delivery type all objects that are directly or indirectly reference by the application service document and that map to any regular expression pattern or start with a URL as defined in any one of the values of the delivery URL regular expression pattern elements (e.g., "URL/RegexPattern") may be accessible through HTTP unicast.

In an embodiment, for each delivery method/context element indicating a USD based delivery as a metadata fragment type delivery, the USD including the application service document may also include metadata fragments that carry all objects that are directly referenced by the application service document and that map to any regular expression pattern or start with a URL as defined in any one of the values of the delivery URL regular expression pattern elements (e.g., "URL/RegexPattern"). Additionally, for each delivery method/context element indicating a USD based delivery as a metadata fragment type delivery, the attribute for the delivered object (e.g., "@metadataURI") may match the referenced URL in the announced application service entry point. Further, for each delivery method/context element indicating a USD based delivery as a metadata fragment type delivery, the valid from/until window (e.g., "@validFrom" to "@validUntil" window) in the metadata fragment may be set such that it covers the availability window of the object for the application service.

In an embodiment, for each delivery method/context element indicating delivery through an MBMS download delivery type, the user service may be a download delivery service and include a download delivery element (e.g., "downloadDelivery") referencing a session description protocol (SDP) that describes the FLUTE transport. Additionally, the download delivery session may deliver all objects that are directly or indirectly referenced by the application service document and that map to any regular expression pattern or start with a URL as defined in any one of the values of the delivery URL regular expression pattern elements (e.g., "URL/RegexPattern"). When the service area attribute (e.g., @serviceArea) is present, the delivery of the objects may be restricted to the specified service area. When the group attribute (e.g., @group) is present, the delivery of objects may be restricted to the specified group. Further, each referenced object may delivered as a FLUTE object and the content location element in the file delivery table (FDT) for the delivered object may match the reference URL in the announced application service entry point. Also, each download delivery session may deliver objects such that the last packet of the delivered object is available at the receiver device at its due time announced in the application service entry point.

Regarding DASH specifically, the various embodiment application service documents may enable the same service to be delivered partially through MBMS download delivery and partially through unicast, thereby supporting seamless transfer at receiver device. A DASH enabled receiver device may use the information in the application service document to refer to elements, which describe representations available for either or both broadcast and unicast reception. In addition, different pieces of the service may be delivered through different download delivery sessions as indicated in the application service document. In a specific DASH embodiment, the content type attribute may be set to "video/dash+xml", "audio/dash+xml", or "application/dash+xml". In a further embodiment, the content type may be extended by the profile parameter to indicate conformance to one or multiple profiles of DASH. In an embodiment, all DASH initialization segments may be delivered using USD based delivery as a metadata fragment.

FIG. 1 illustrates a cellular network system 100 suitable for use with the various embodiments. The cellular network system 100 may include multiple devices, such as a receiver device 102, one or more cellular towers or base stations 104, and servers 108 and 112 connected to the Internet 110. The receiver device 102 may exchange data via one or more cellular connections 106, including CDMA, TDMA, GSM, PCS, 3G, 4G, LTE, or any other type connection, with the cellular tower or base station 104. The cellular tower or base station 104 may be in communication with a router which may connect to the Internet 110. In this manner, via the connections to the cellular tower or base station 104, and/or Internet 110, data may be exchanged between the receiver device 102 and the server(s) 108 and 112. In an embodiment, server 108 may be one or more broadcast network operator servers controlling the operations of the cellular network 100 including the receiver device 102 and the cellular tower or base station 104 and the provisioning of services to the receiver device 102 from the content server(s) 108 and 112.

Figure 2:
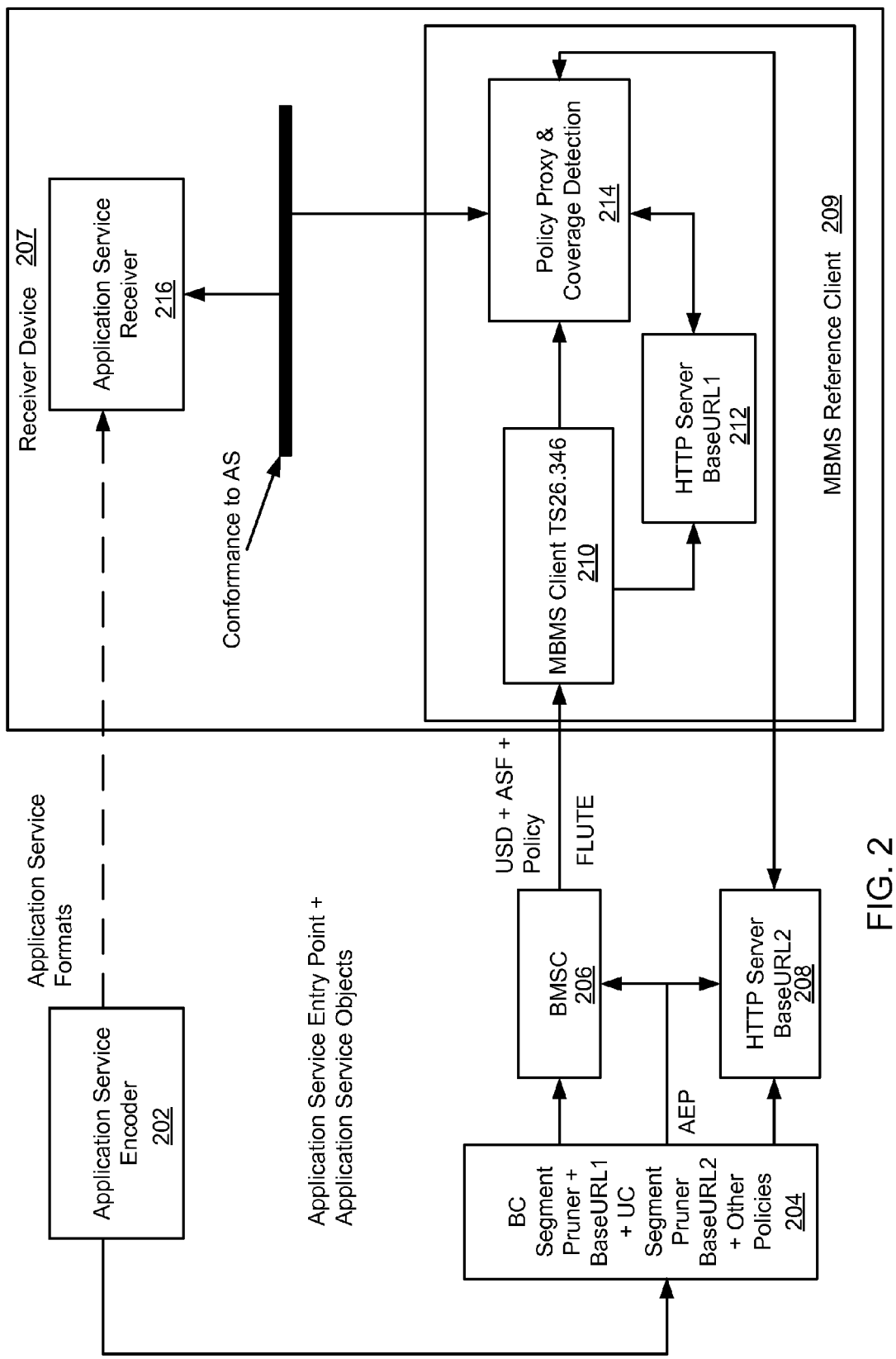
FIG. 2 is a block diagram of components of an embodiment network system.

FIG. 2 illustrates various components of an MBMS network including an application service encoder 202, MBMS network operator server 204, HTTP server 208, BMSC server 206, and receiver device 207. The receiver device 207 may include a MBMS reference client 209 that may manage receipt of objects via various methods, such as unicast, broadcast, MBMS download delivery, etc. and make received objects available to the application service receiver 216, such as a DASH player, Apple® HTTP Live Streaming player, etc. The application service encoder 202 may encode objects in an application service format, such as DASH, Apple® HTTP Live Streaming, etc. and output the objects for the service to an MBMS network operator server 204 for delivery to the receiver device 207. The application service encoder 202 may encode the objects of the service using an application service format that is the same application service format used by the application service receiver 216 of the receiver device 207. The MBMS network operator server 204 may receive the objects for the service from the application service encoder 202 and prune the segments of the service and apply other policies as appropriate. The MBMS network operator server 204 may generate an application service entry point document, such as an MPD for a DASH media presentation, an HTML page, an Apple® HTTP Live Streaming M3U8 play list, etc., based on various attributes of the objects, network policy, and/or other considerations (e.g., bandwidth, expected popularity, content dynamics, etc.), and send the application service entry point document to the BMSC server 206 and the HTTP server 208. The MBMS network operator server 204 may also generate an application service document, such as an application service fragment, and provide the application service document and objects for the service to the BMSC server 206 and/or the HTTP server 208. The BMSC server 206 may provide a USD, the application service document, other network policy indications, the application service entry point document, and objects of the service to a 3GPP MBMS client 210 of the MBMS reference client 209 via FLUTE. The 3GPP MBMS client 210 may provide the USD, the application service document, other network policy indications, the application service entry point document, and objects of the service to the policy proxy and coverage detection module 214 of the MBMS reference client 209. The HTTP server 208 may provide the application service document, other network policy indications, the application service entry point document, and objects of the service to a policy proxy and coverage detection module 214 of the MBMS reference client 209. The 3GPP MBMS client 210 and the policy proxy and coverage detection module 214 may provide received objects to an HTTP server 212 of the MBMS reference client 209. The policy proxy and coverage detection module 214 may receive requests for objects of a service from the application service receiver 216 and may provide objects conforming to the application service format to the application service receiver 216.

In operation, the policy proxy and coverage detection module 214 of the MBMS reference client 209 may parse a received application service document and identify information about the service, such as whether objects of the service are available from the BMSC 206 or HTTP server 208, any service area restrictions applicable to the service, any group restrictions applicable to the service, etc. When an object request is received from the application service receiver 216 at the policy proxy and coverage detection module 214, the policy proxy and coverage detection module 214 may select a delivery method/context for the requested object based on the information in the application service document and other information (e.g., current service area, current coverage area, group association, etc.) For example, the policy proxy and coverage detection module 214 may determine that the receiver device 207 is outside a MBMS coverage area and thus may select unicast delivery for the object. As another example, the policy proxy and coverage detection module 214 may determine that the object is available via both unicast and multicast delivery in restricted service areas based on the application service document. As a further example, the policy proxy and coverage detection module 214 may determine that the receiver device 207 is not a member of a group authorized to receive multicast delivery, and thus may select unicast delivery of the object.

The policy proxy and coverage detection module 214 may determine that the current service area that the receiver device 207 is located in matches a restricted service area listed in the application service document and/or that the current group with which the receiver device 207 is associated matches a restricted group listed in the application service document, and thus may select multicast delivery for the object. When requested objects are received from the BMSC server 206 or the HTTP server 208, the policy proxy and coverage detection module 214 may receive the objects from directly from the 3GPP MBMS client 210 or the HTTP server 212, respectively, or may retrieve the objects from the HTTP server 208. The objects may then be provided from the policy proxy and coverage detection module 214 to the application service receiver 216. In this manner, the application service receiver 216 may receive objects via unicast or multicast without any MBMS delivery method/context selection logic being required at the application service receiver 216.

Figure 3A:
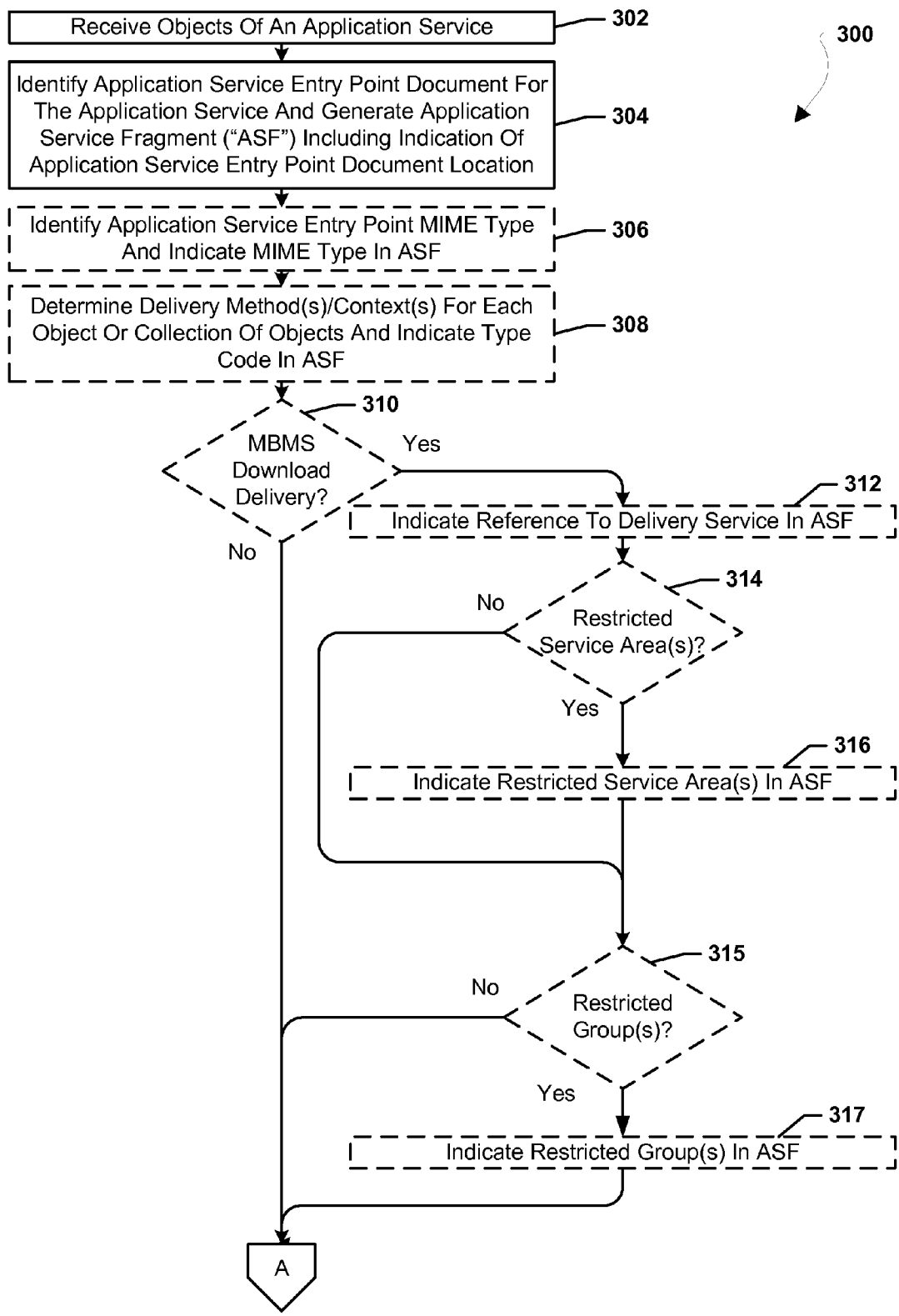
FIGS. 3A and 3B are process flow diagrams illustrating an embodiment method for generating an application service fragment.
Figure 3B:
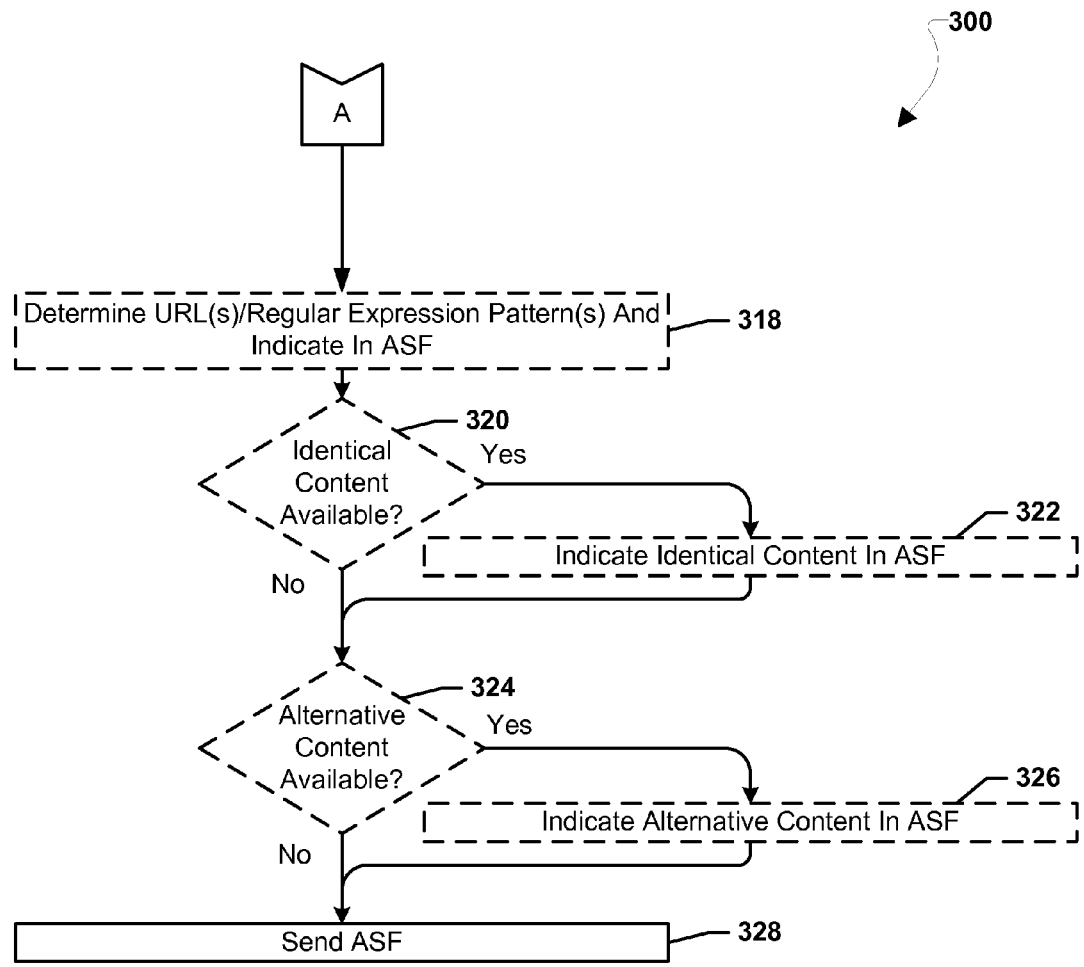

FIGS. 3A and 3B illustrates an embodiment method 300 for generating an application service document, such as an application service fragment (ASF). In an embodiment, the operations of the method 300 may be performed by a server, such as an MBMS network operator server. In block 302 (FIG. 3A) the server may receive objects of an application service. As an example, the objects may be segments of a DASH service.

In block 304 the server may identify an application service entry point document for the application service and generate an application service fragment (ASF) including an indication of the application service entry point document location. As examples, an application service entry point document may be an MPD or M3U8 file and the URI of the MPD or M3U8 file may be indicated in the ASF. In optional block 306 the server may identify an application service entry point MIME type and indicate the MIME type in the ASF.

In optional block 308 the server may determine a delivery method/context or methods/contexts for each object or collection of objects and indicate a type code in the ASF. As examples, type codes may be "0" for unicast delivery, "1" for USD based delivery as a metadata fragment, or "2" for delivery through MBMS download delivery. Other delivery types, such as streaming delivery methods, enhanced FLUTE delivery, etc., may be indicated by other codes. Delivery methods/contexts may be controlled by content and/or service providers and may be determined based on various factors, including available bandwidth on the MBMS download delivery session, expected popularity of the content, the dynamics of the content, etc.

In optional determination block 310 the server may determine whether MBMS download delivery is indicated as a delivery method/context for any object or collection of object. In response to determining that MBMS download delivery is indicated (i.e., determination block 310="Yes"), the server may indicate a reference to the delivery service in the ASF in block 312. For example, a reference to a session description fragment of the corresponding FLUTE session may be indicated in the ASF.

In optional determination block 314 the server may determine whether any objects are delivered only in a restricted service area or areas. In response to determining that objects are delivered in only a restricted service area or areas (i.e., determination block 314="Yes"), the server may indicate the restricted service area or areas in the ASF in block 316.

In response to the server indicating the restricted service area or areas in the ASF in block 316, or in response to determining no restricted areas are applicable to the objects (i.e., determination block 314="No"), the server may determine whether any objects are delivered only to a restricted group or groups in optional determination block 315. In response to determining that objects are delivered to only a restricted group or groups (i.e., determination block 315="Yes"), the server may indicate the restricted group of groups in the ASF in block 317.

In response to determining that MBMS download delivery is not indicated (i.e., determination block 310="Yes"), that no restricted groups are applicable to the objects (i.e., determination block 315="No"), or that the restricted group or groups are indicated in the ASF, the server may determine URL(s)/Regular Expression Pattern(s) that map to the objects and indicate them in the ASF in optional block 318 (FIG. 3B). In this manner, the ASF may list all base URLs/regular expression patterns that map to the objects that are delivered through each delivery method/context. In an embodiment, if a base URL/regular expression pattern is not indicated in the ASF, all objects referenced in the ASF may be delivered with the same delivery method/context.

In optional determination block 320 the server may determine whether identical content is available. In response to determining that identical content is available (i.e., determination block 320="Yes"), the identical content may be indicated in the ASF in block 322. For example, a list of base URLs that host identical content may be indicated in the ASF. In response to determining that identical content is not available (i.e., determination block 324="No") or the identical content is indicated in the ASF, the server may determine whether alternative content is available in optional determination block 324. In response to determining that alternative content is available (i.e., determination block 324="Yes"), the server may indicate alternative content in the ASF in block 326. As an example, a list of base URLs that host alternative content may be indicated in the ASF. In response to determining that alternative content is not available (i.e., determination block 324="No") or the alternative content is indicated in the ASF, the server may send the ASF in block 328. In an embodiment, the ASF may be sent as part of a USD to a MBMS client of a receiver device.

The operations of method 300 described above with reference to FIGS. 3A and 3B may result in the generation of various different application service fragments. For example, the following may be an example MPD schema:

```
<?xml version="1.0"?>
<MPD
xmlns:xsi="http://www.w3.org/2001/XMLSchema-instance"
xmlns="urn:mpeg:dash:schema:mpd:2011"
xsi:schemaLocation="urn:mpeg:dash:schema:mpd:2011 DASH-MPD.xsd"
minBufferTime="PT1.500000S"
type="dynamic"
mediaPresentationDuration="PT0H10M53.79S"
profiles="urn:mpeg:dash:profile:isoff-live:2011">
<BaseURL>http://example.com/</BaseURL>
<Location>example.mpd</Location>
<Period id="P1" duration="PT0H10M53.79S">
 <AdaptationSet segmentAlignment="true">
  <Representation id="A1" mimeType="audio/mp4" codecs="mp4a.40.1d"
audioSamplingRate="44100" startWithSAP="1" bandwidth="64839">
   <SegmentTemplate timescale="44100" duration="440294"
media="ED_a_$Number$.mp4" startNumber="1" initialization="ED_a_init.mp4"/>
  </Representation>
 </AdaptationSet>
 <AdaptationSet mimeType="video/mp4" segmentAlignment="true" width="1280"
height="720" frameRate="2997/100" par="16:9" codecs="avc1.4d401f"
startWithSAP="1">
  <SegmentTemplate timescale="2997" duration="26999" startNumber="1"/>
  <Representation id="V1" bandwidth="972840">
   <SegmentTemplate media="ED_1M_v_$Number$.mp4"
initialization="ED_1M_v_init.mp4"/>
  </Representation>
  <Representation id="V2" startWithSAP="1" bandwidth="1936362">
   <SegmentTemplate media="ED_2M_v_$Number$.mp4"
initialization="ED_2M_v_init.mp4"/>
  </Representation>
  <Representation id="V3" bandwidth="4172303">
   <SegmentTemplate media="ED_4M_v_$Number$.mp4"
initialization="ED_4M_v_init.mp4"/>
  </Representation>
 </AdaptationSet>
</Period>
</MPD>
```

Assuming audio and a representation "V2" of a DASH service are distributed over MBMS in one FLUTE session and the MPD and the initialization segment are delivered as part of the USD fragment, the following may be an example schema of the application service fragment:

```
<?xml version="1.0"?>
<ApplicationServiceFragment xmlns:xsi="http://www.w3.org/2001/XMLSchema-
instance"
```

```
   xmlns="urn:3gpp:mbms:schema:asf:2013"
   xsi:schemaLocation="urn:3gpp:mbms:schema:asf:2013 asf.xsd"
   contentLocation="http://example.com/example.mpd"
   contentType="video/dash+xml profiles='urn:mpeg:dash:profile:isoff-live:2011'">
   <DeliveryMethodMapping type="1">
      <URLRegexPattern>http://example.com/ED_*_init.mp4</URLRegexPattern>
   </DeliveryMethodMapping>
   <DeliveryMethodMapping type="2"
reference="http://mbmsdeliveryrocks.com/flutesession1.sdp">
      <URLRegexPattern>http://example.com/ED_a_[:digit:].mp4</URLRegexPattern>
   </DeliveryMethodMapping>
   <DeliveryMethodMapping type="2"
reference="http://mbmsdeliveryrocks.com/flutesession1.sdp">
   <URLRegexPattern>http://example.com/ED_2M_v_[:digit:].mp4</URLRegexPattern>
   </DeliveryMethodMapping>
</ApplicationServiceFragment>
```

The above schema of the application service fragment may indicate that three metadata fragments must be present, the MPD and two initialization segments. It also describes that all media segments of the MPD for the audio and 2 MBit/s video are delivered through FLUTE session 1.

As another example, based on the same MPD example schema described above, assuming the audio and the representation "V2" of a DASH service are distributed over MBMS in the same FLUTE session, the MPD and the initialization segment are delivered as part of the USD fragment, and all data is also available on unicast, the following may be an example schema of the application service fragment:

```
<?xml version="1.0"?>
<ApplicationServiceFragment xmlns:xsi="http://www.w3.org/2001/XMLSchema-instance"
   xmlns="urn:3gpp:mbms:schema:asf:2013"
   xsi:schemaLocation="urn:3gpp:mbms:schema:asf:2013 asf.xsd"
   contentLocation="http://example.com/example.mpd"
   contentType="video/dash+xml profiles='urn:mpeg:dash:profile:isoff-live:2011'">
   <DeliveryMethodMapping type="0"/>
   <DeliveryMethodMapping type="1">
      <URLRegexPattern>http://example.com/ED_*_init.mp4</URLRegexPattern>
   </DeliveryMethodMapping>
   <DeliveryMethodMapping type="2"
reference="http://mbmsdeliveryrocks.com/flutesession1.sdp">
      <URLRegexPattern>http://example.com/ED_a_[:digit:].mp4</URLRegexPattern>
   </DeliveryMethodMapping>
   <DeliveryMethodMapping type="2"
reference="http://mbmsdeliveryrocks.com/flutesession1.sdp">
   <URLRegexPattern>http://example.com/ED_2M_v_[:digit:].mp4</URLRegexPattern>
   </DeliveryMethodMapping>
</ApplicationServiceFragment>
```

As another example, assuming the audio and the representation "V2" of a DASH service are distributed over MBMS in the same FLUTE session, the MPD and the initialization segment are delivered as part of the USD fragment, all data is also available on unicast, and the DASH client is to be made aware of the different delivery methods/contexts, the following may be an example schema of an MPD for the service:

```
<?xml version="1.0"?>
<MPD
xmlns:xsi="http://www.w3.org/2001/XMLSchema-instance"
xmlns="urn:mpeg:dash:schema:mpd:2011"
xsi:schemaLocation="urn:mpeg:dash:schema:mpd:2011 DASH-MPD.xsd"
minBufferTime="PT1.500000S"
type="dynamic"
```

```
mediaPresentationDuration="PT0H10M53.79S"
profiles="urn:mpeg:dash:profile:isoff-live:2011">
<BaseURL>http://example.com/</BaseURL>
<Location>example.mpd</Location>
<Location>http://mbmsdelivery.com/example.mpd</Location>
<Period id="P1" duration="PT0H10M53.79S">
 <AdaptationSet segmentAlignment="true">
  <BaseURL>http://mbmsdelivery.com/</BaseURL>
  <Representation id="A1" mimeType="audio/mp4" codecs="mp4a.40.1d"
audioSamplingRate="44100" startWithSAP="1" bandwidth="64839">
   <SegmentTemplate timescale="44100" duration="440294"
media="ED_a_$Number$.mp4" startNumber="1" initialization="ED_a_init.mp4"/>
  </Representation>
 </AdaptationSet>
 <AdaptationSet mimeType="video/mp4" segmentAlignment="true" width="1280"
height="720" frameRate="2997/100" par="16:9" codecs="avc1.4d401f"
startWithSAP="1">
  <SegmentTemplate timescale="2997" duration="26999" startNumber="1"/>
  <Representation id="V1" bandwidth="972840">
   <SegmentTemplate media="ED_1M_v_$Number$.mp4"
initialization="ED_1M_v_init.mp4"/>
  </Representation>
  <Representation id="V2" startWithSAP="1" bandwidth="1936362">
   <BaseURL>http://mbmsdelivery.com/</BaseURL>
   <SegmentTemplate media="ED_2M_v_$Number$.mp4"
initialization="ED_2M_v_init.mp4"/>
  </Representation>
  <Representation id="V3" bandwidth="4172303">
   <SegmentTemplate media="ED_4M_v_$Number$.mp4"
initialization="ED_4M_v_init.mp4"/>
  </Representation>
 </AdaptationSet>
</Period>
</MPD>
```

This may be described in the following example schema for an application service:

```
<?xml version="1.0"?>
<ApplicationServiceFragment xmlns:xsi="http://www.w3.org/2001/XMLSchema-instance"
    xmlns="urn:3gpp:mbms:schema:asf:2013"
    xsi:schemaLocation="urn:3gpp:mbms:schema:asf:2013 asf.xsd"
    contentLocation="http://mbmsdelivery.com/example.mpd"
    contentType="video/dash+xml profiles='urn:mpeg:dash:profile:isoff-live:2011'">
    <DeliveryMethodMapping type="0"
       <URLRegexPattern>http://example.com</URLRegexPattern>
    </DeliveryMethodMapping>
    <DeliveryMethodMapping type="1">
     <URLRegexPattern>http://mbmsdelivery.com/ED_*_init.mp4</URLRegexPattern>
    </DeliveryMethodMapping>
    <DeliveryMethodMapping type="2"
reference="http://mbmsdeliveryrocks.com/flutesession1.sdp">
<URLRegexPattern>http://mbmsdelivery.com/ED_a_[:digit:].mp4</URLRegexPattern>
    </DeliveryMethodMapping>
    <DeliveryMethodMapping type="2"
reference="http://mbmsdeliveryrocks.com/flutesession1.sdp">
<URLRegexPattern>http://mbmsdelivery.com/ED_2M_v_[:digit:].mp4</URLRegexPattern>
    </DeliveryMethodMapping>
</ApplicationServiceFragment>
```

In the above example, MBMS delivery is indicated by the URL http://mbmsdelivery.com.

As a further example, assuming the audio and the representation "V2" of a DASH service are distributed over MBMS in different FLUTE sessions, the MPD and the initialization segment are delivered as part of the USD fragment, all data is also available on unicast, and the DASH client is to be made aware of the different delivery methods/contexts, the following may be an example schema of an MPD for the service:

```
<?xml version="1.0"?>
<MPD
  xmlns:xsi="http://www.w3.org/2001/XMLSchema-instance"
  xmlns="urn:mpeg:dash:schema:mpd:2011"
```

```
xsi:schemaLocation="urn:mpeg:dash:schema:mpd:2011 DASH-MPD.xsd"
minBufferTime="PT1.500000S"
type="dynamic"
mediaPresentationDuration="PT0H10M53.79S"
profiles="urn:mpeg:dash:profile:isoff-live:2011">
<BaseURL>http://example.com/</BaseURL>
<Location>example.mpd</Location>
<Location>http://mbmsdelivery.com/example.mpd</Location>
<Period id="P1" duration="PT0H10M53.79S">
 <AdaptationSet segmentAlignment="true">
 <BaseURL>http://mbmsdelivery.com/audio</BaseURL>
 <Representation id="A1" mimeType="audio/mp4" codecs="mp4a.40.1d"
audioSamplingRate="44100" startWithSAP="1" bandwidth="64839">
   <SegmentTemplate timescale="44100" duration="440294"
media="ED_a_$Number$.mp4" startNumber="1" initialization="ED_a_init.mp4"/>
   </Representation>
 </AdaptationSet>
 <AdaptationSet mimeType="video/mp4" segmentAlignment="true" width="1280"
height="720" frameRate="2997/100" par="16:9" codecs="avc1.4d401f"
startWithSAP="1">
   <SegmentTemplate timescale="2997" duration="26999" startNumber="1"/>
   <Representation id="V1" bandwidth="972840">
   <SegmentTemplate media="ED_1M_v_$Number$.mp4"
initialization="ED_1M_v_init.mp4"/>
   </Representation>
   <Representation id="V2" startWithSAP="1" bandwidth="1936362">
    <BaseURL>http://mbmsdelivery.com/video</BaseURL>
    <SegmentTemplate media="ED_2M_v_$Number$.mp4"
initialization="ED_2M_v_init.mp4"/>
   </Representation>
   <Representation id="V3" bandwidth="4172303">
    <SegmentTemplate media="ED_4M_v_$Number$.mp4"
initialization="ED_4M_v_init.mp4"/>
   </Representation>
 </AdaptationSet>
 </Period>
</MPD>
```

This may be described in the following example schema for an application service:

```
<?xml version="1.0"?>
<ApplicationServiceFragment xmlns:xsi="http://www.w3.org/2001/XMLSchema-
instance"
   xmlns="urn:3gpp:mbms:schema:asf:2013"
   xsi:schemaLocation="urn:3gpp:mbms:schema:asf:2013 asf.xsd"
   contentLocation="http://mbmsdelivery.com/example.mpd"
   contentType="video/dash+xml profiles='urn:mpeg:dash:profile:isoff-live:2011'">
   <DeliveryMethodMapping type="0">
      <URLRegexPattern>http://example.com</URLRegexPattern>
   </DeliveryMethodMapping>
   <DeliveryMethodMapping type="1">
      <URLRegexPattern>http://mbmsdelivery.com/ED_*_init.mp4</URLRegexPattern>
   </DeliveryMethodMapping>
   <DeliveryMethodMapping type="2"
reference="http://mbmsdeliveryrocks.com/flutesession1.sdp">
<URLRegexPattern>http://mbmsdelivery.com/audio/ED_a_[:digit:].mp4</
URLRegexPattern>
   </DeliveryMethodMapping>
   <DeliveryMethodMapping type="2"
reference="http://mbmsdeliveryrocks.com/flutesession2.sdp">
<URLRegexPattern>http://mbmsdelivery.com/video/ED_2M_v_[:digit:].mp4</URLRegex
Pattern>
   </DeliveryMethodMapping>
</ApplicationServiceFragment>
```

As another example, based on the same MPD example schema described above, assuming the audio and the representation "V2" of a DASH service are distributed over MBMS in the same FLUTE session restricted to a specific service area, the MPD and the initialization segment are delivered as part of the USD fragment, all data is also available on unicast, and the DASH client is to be made aware of the different delivery methods/contexts, the following may be an example schema of the application service fragment:

```xml
<?xml version="1.0"?>
<ApplicationServiceFragment xmlns:xsi="http://www.w3.org/2001/XMLSchema-
instance"
    xmlns="urn:3gpp:mbms:schema:asf:2013"
    xsi:schemaLocation="urn:3gpp:mbms:schema:asf:2013 asf.xsd"
    contentLocation="http://mbmsdelivery.com/example.mpd"
    contentType="video/dash+xml profiles='urn:mpeg:dash:profile:isoff-live:2011'">
    <DeliveryMethodMapping type="0">
       <URLRegexPattern>http://example.com</URLRegexPattern>
    </DeliveryMethodMapping>
    <DeliveryMethodMapping type="1">
     <URLRegexPattern>http://mbmsdelivery.com/ED_*_init.mp4</URLRegexPattern>
    </DeliveryMethodMapping>
    <DeliveryMethodMapping type="2"
reference="http://mbmsdeliveryrocks.com/flutesession1.sdp" serviceArea="xyz">
<URLRegexPattern>http://mbmsdelivery.com/ED_a_[:digit:].mp4</URLRegexPattern>
    </DeliveryMethodMapping>
    <DeliveryMethodMapping type="2"
reference="http://mbmsdeliveryrocks.com/flutesession1.sdp" serviceArea="xyz">
<URLRegexPattern>http://mbmsdelivery.com/ED_2M_v_[:digit:].mp4</
URLRegexPattern>
    </DeliveryMethodMapping>
</ApplicationServiceFragment>
```

The following is an example schema of an application service fragment for an Apple® HTTP Live Streaming service provided through MBMS, namely the playlist and one representation:

```xml
<?xml version="1.0"?>
<ApplicationServiceFragment xmlns:xsi="http://www.w3.org/2001/XMLSchema-
instance"
    xmlns="urn:3gpp:mbms:schema:asf:2013"
    xsi:schemaLocation="urn:3gpp:mbms:schema:asf:2013 asf.xsd"
    contentLocation="http://mbmsdelivery.com/example.m3u8"
    contentType="application/x-mpegURL">
    <DeliveryMethodMapping type="0">
       <URLRegexPattern>http://example.com</URLRegexPattern>
    </DeliveryMethodMapping>
     <DeliveryMethodMapping type="2"
reference="http://mbmsdeliveryrocks.com/flutesession1.sdp">
<URLRegexPattern>http://mbmsdelivery.com/ED_2M_[:digit:].ts</URLRegexPattern>
    </DeliveryMethodMapping>
</ApplicationServiceFragment>
```

The following is an example schema of a USD as an application service with the application service fragment provided to indicate that the USD is available through unicast and through a FLUTE session:

```xml
<?xml version="1.0"?>
<ApplicationServiceFragment xmlns:xsi="http://www.w3.org/2001/
XMLSchema-instance"
    xmlns="urn:3gpp:mbms:schema:asf:2013"
    xsi:schemaLocation="urn:3gpp:mbms:schema:asf:2013 asf.xsd"
    contentLocation="http://mbmsdelivery.com/example.usd"
    contentType="application/mbms-user-service-description+xml">
    <DeliveryMethodMapping type="0"/>
    <DeliveryMethodMapping type="2"
reference="http://mbmsdeliveryrocks.com/flutesession1.sdp"/>
</ApplicationServiceFragment>
```

Figure 4A:
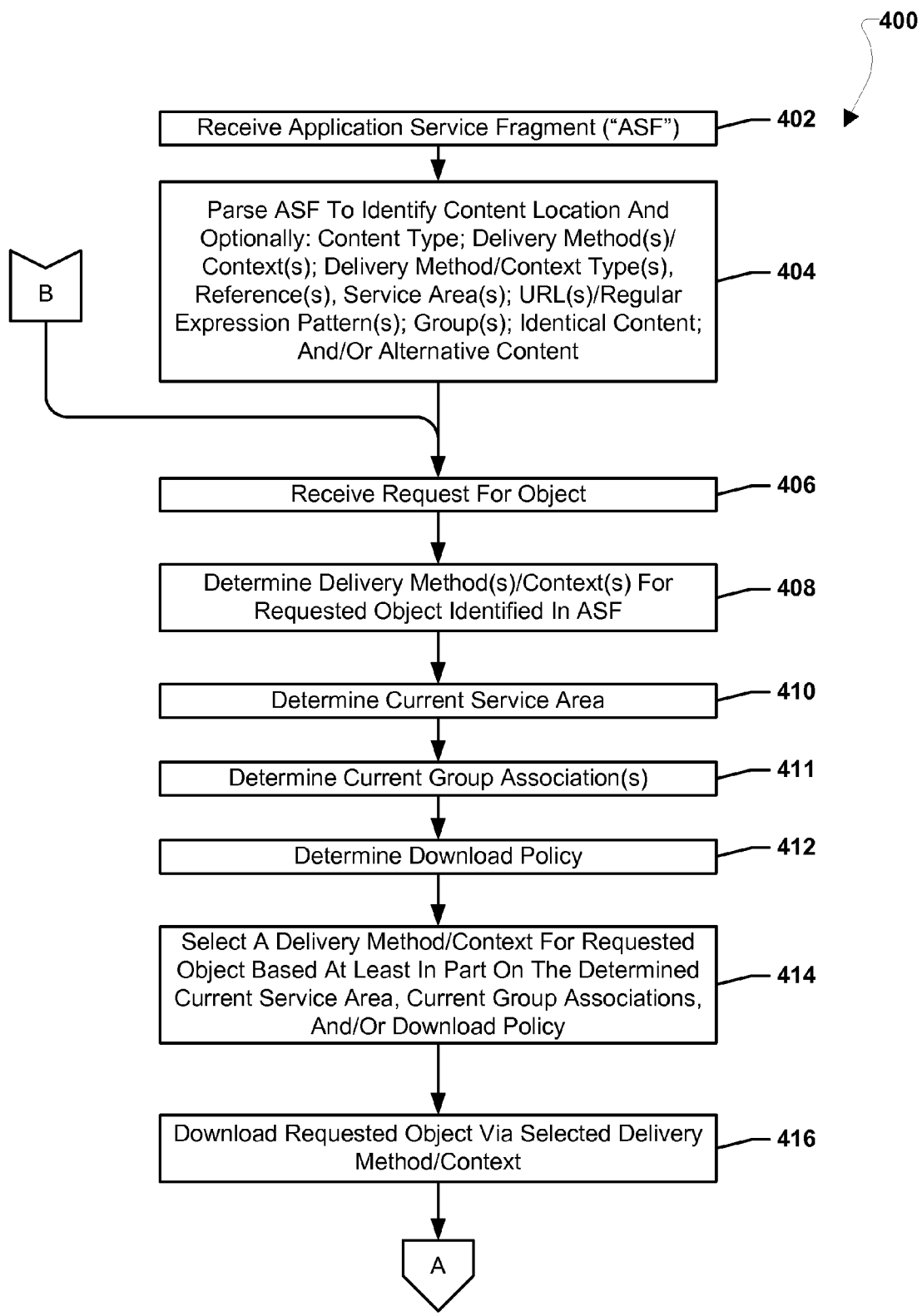
FIGS. 4A and 4B are process flow diagrams illustrating an embodiment method for enforcing switching between delivery methods/contexts.
Figure 4B:
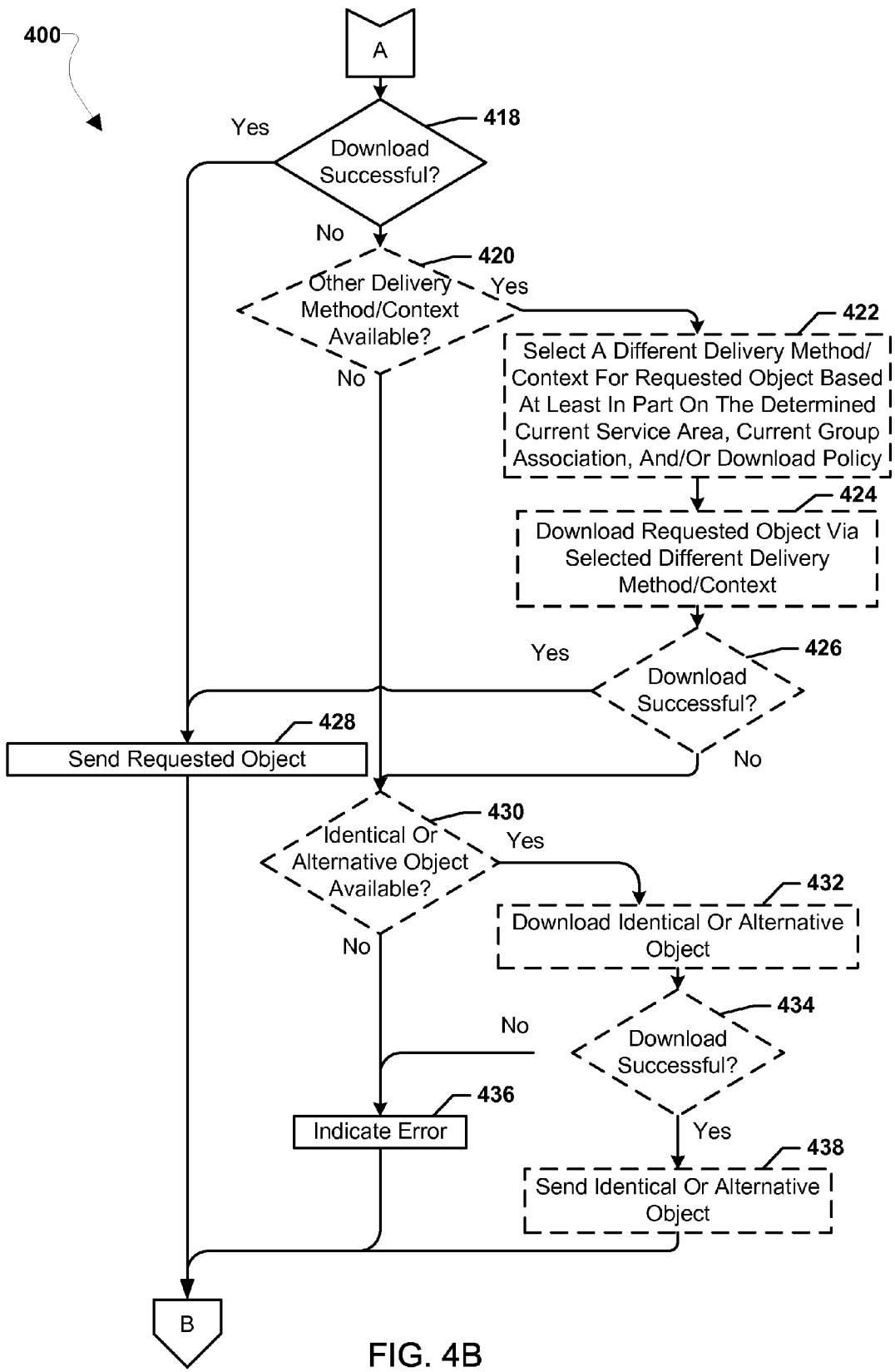

FIGS. 4A and 4B illustrates an embodiment method 400 for enforcing switching between delivery methods/contexts. In an embodiment, the operations of method 400 may be performed in conjunction with the operations of method 300 described above. In an embodiment, the operations of method 400 may be performed by an MBMS client running on a processor of a receiver device. In block 402 (FIG. 4A) the MBMS client may receive an application service fragment (ASF). As an example, the ASF may be received as part of a USD. In block 404 the MBMS client may parse the ASF to identify a content location and optionally a content type, delivery method/context or methods/contexts, delivery method/context type(s), delivery method/context reference(s), and delivery method/context service area(s), URL(s)/regular expression pattern(s), delivery method/context group(s), identical content, and/or alternative content as indicated in the ASF. In block 406 the MBMS client may receive a request for an object. For example, the MBMS client may receive a request for next media segment from a media application (e.g., a DASH player, Apple® HTTP Live Streaming player, etc.) of the receiver device. In block 408 the MBMS client may determine delivery method/context or methods/contexts for the requested objected identified in the ASF. For example, the MBMS client may determine that the requested object is available via unicast and MBMS download delivery based on the type codes identified during parsing of the ASF. In block 410 the MBMS client may determine the current service area in which the receiver device may be located. In block 411 the MBMS client may determine the current group association(s) of the receiver device (e.g., the membership of the receiver device and/or user of the receiver device in one or more group). In block 412 the MBMS client may determine a download policy. For example, the download policy may be preferences for one delivery method/context over another delivery method/context stored in a memory available to the MBMS client.

In block 414 the MBMS client may select a delivery method/context for the requested object based at least in part on the determined current service area, current group associations, and/or download policy. As an example, when both unicast delivery and MBMS download delivery are indicated as delivery methods for the requested object in the ASF, the MBMS client may determine that both unicast and MBMS download delivery are available in the current service area and, based on a preference for MBMS download delivery, may select MBMS download delivery. As another example, when both unicast delivery and MBMS download delivery are indicated as delivery methods for the requested object in the ASF, the MBMS client may determine that both unicast and MBMS download delivery are available in the current service area and, based on unicast delivery being associated with the receiver device's current group association, may select unicast download delivery. In block 416 the MBMS client may download the requested object via the selected delivery method/context. For example, the MBMS client may join a FLUTE session scheduled to provide the requested object.

In determination block 418 (FIG. 4B) the MBMS client may determine whether download of the requested object was successful. In response to determining that download was successful (i.e., determination block 418="Yes"), the MBMS client may send the requested object to the requesting application or client in block 428, and, as discussed above, receive another object request in block 406 (FIG. 4A).

In response to determining that download was not successful (i.e., determination block 418="No"), the MBMS client may determine whether other delivery methods/contexts are available in optional determination block 420 (FIG. 4B). For example, the MBMS client may identify that a different delivery method/context is available in the current service area based on the indicated delivery methods/contexts in the ASF. In response to determining that other delivery methods/contexts are available (i.e., determination block 420="Yes"), in optional block 422 the MBMS client may select a different delivery method/context for the requested object based at least in part on the determined current service area, current group association, and/or the download policy. For example, assuming MBMS download delivery was unsuccessful and unicast delivery is also indicated in the ASF and allowed by the download policy, the MBMS client may elect to download the requested object via unicast. In optional block 424 the MBMS client may download the requested object via the selected different delivery method/context. In optional determination block 426 the MBMS client may determine whether the download was successful. In response to determining that download was successful (i.e., determination block 426="Yes"), the MBMS client may send the requested object to the requesting application or client in block 428, and, as discussed above, receive another object request in block 406 (FIG. 4A).

In response to determining that other delivery methods/contexts are not available (i.e., determination block 420="No") or download was not successful (i.e., determination block 426="No"), the MBMS client may determine whether identical or alternative objects are available in optional determination block 430 (FIG. 4B). For example, the MBMS client may identify URLs for identical content and/or alternative content based on lists of identical or alternative content indicated in the ASF. In response to determining that identical or alternative objects are not available (i.e., determination block 436="No"), the MBMS client may indicate an error in block 436, and, as discussed above, inreceive another object request block 406 (FIG. 4A).

For example, the MBMS client may indicate the requested object is unavailable to the requesting application or client.

In response to determining that identical or alternative objects are available (i.e., determination block 430="Yes"), the MBMS client may download the identical or alternative objects in optional block 432 (FIG. 4B). In optional determination block 434 the MBMS client may determine whether the download was successful. In response to determining that download was not successful (i.e., determination block 434="Yes"), as discussed above, the MBMS client may indicate an error in block 436. In response to determining that download was successful (i.e., determination block 434="Yes"), the MBMS client may send the identical or alternative requested object to the requesting application or client in optional block 438, and, as discussed above, receive another object request in block 406 (FIG. 4A).

Figure 5A:
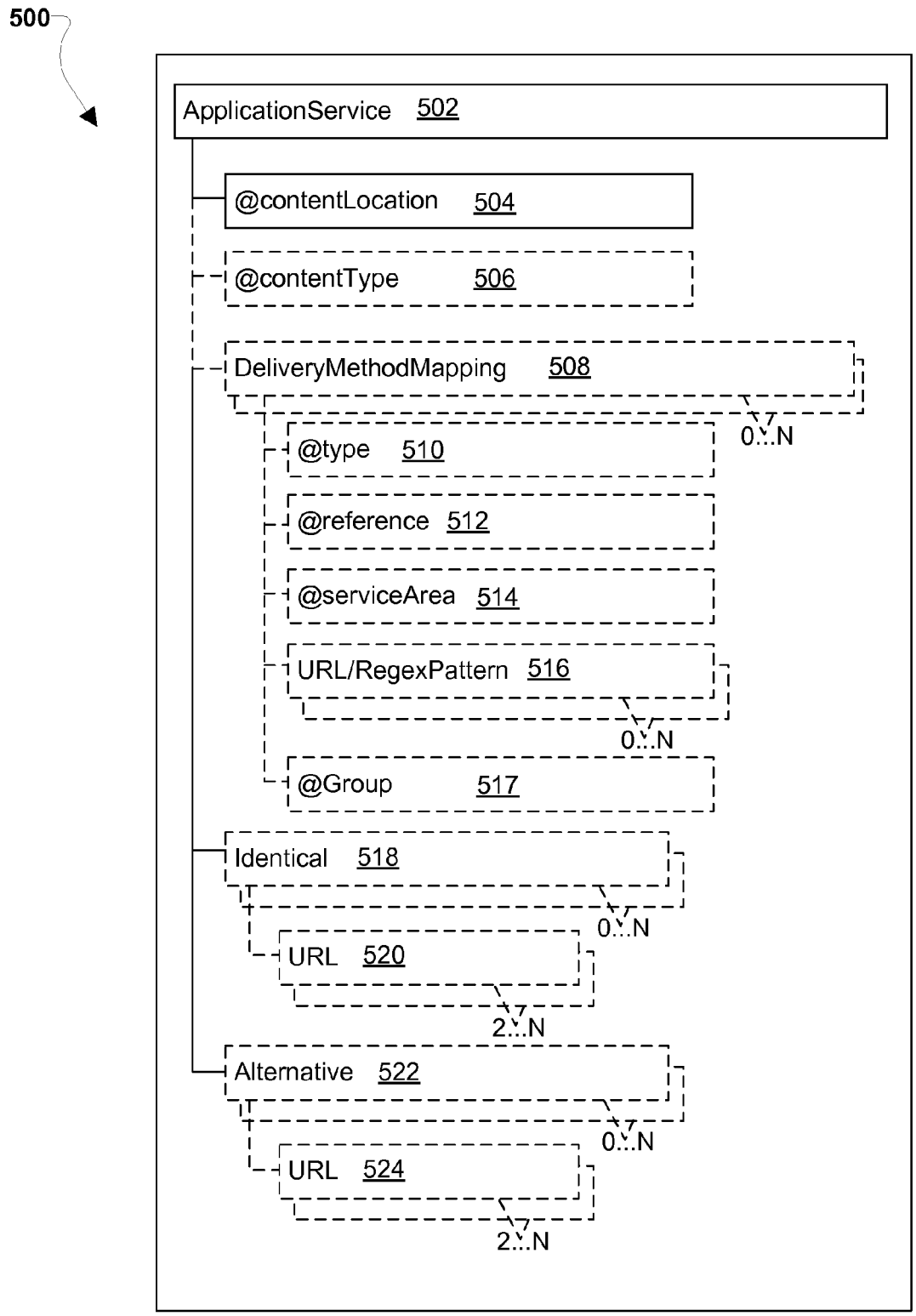
FIG. 5A is a data structure diagram of an application service fragment according to an embodiment.

FIG. 5A is a data structure diagram of an application service fragment 502 that may be include in a USD 500 according to an embodiment. The application service fragment 502 may include a content location attribute 504. Optionally, the application service fragment 502 may also include a content type 506. Optionally, the application service fragment 502 may include one or more delivery method/context elements 508, for example one for each delivery method/context. Each delivery method element/context 508 may optionally include a delivery/context type attribute 510, a reference attribute 512, service area attribute 514, one or more URL/regular extension pattern element 516, and a group attribute 517. Optionally, the application service fragment 502 may include an identical content element 518 including a list of URLs 520 of identical content. Optionally, the application service fragment 502 may include an alternative content element 522 including a list of URLs 524 of alternative content.

Figure 5B:
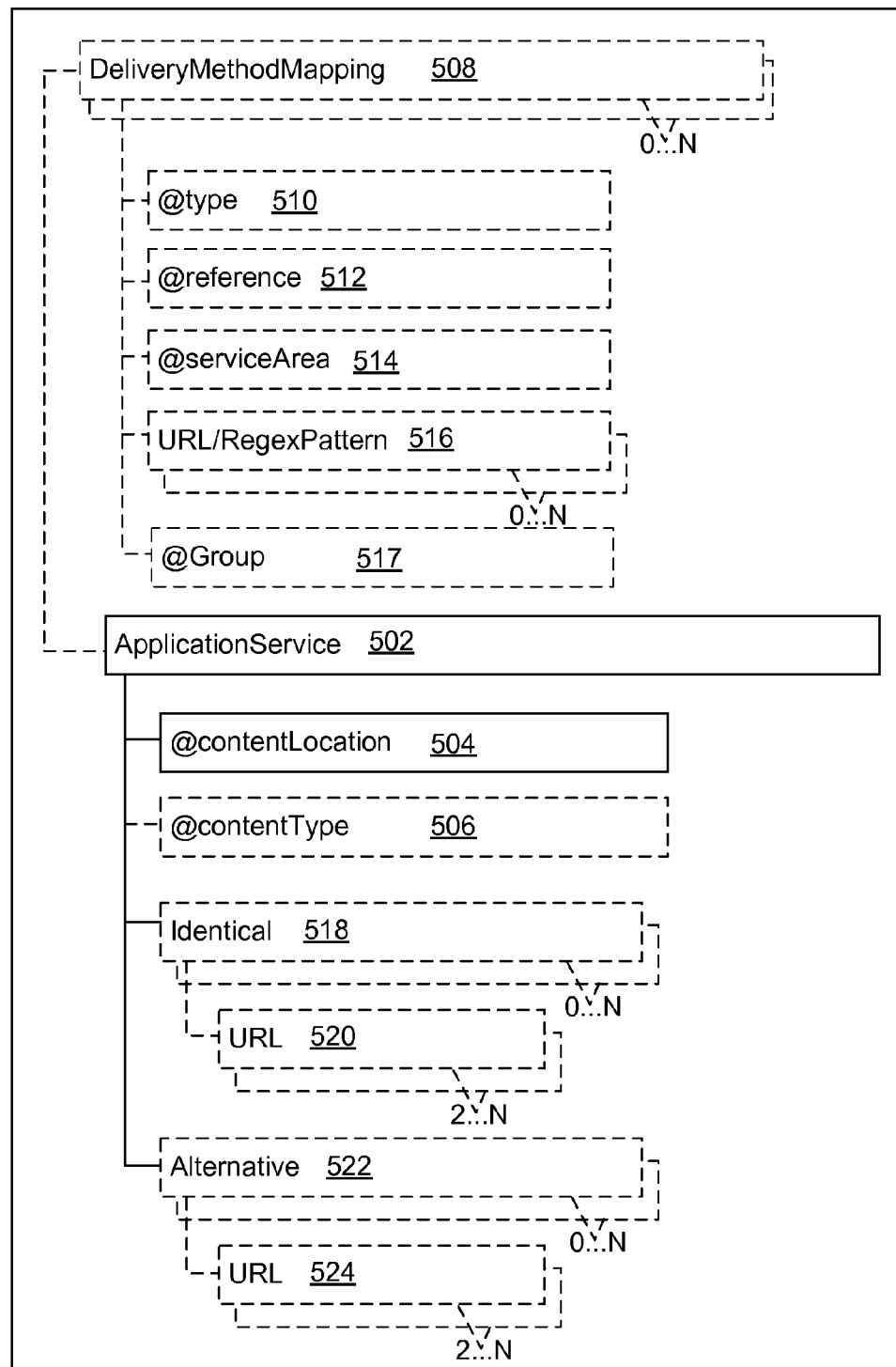
FIG. 5B is a data structure diagram of an application service fragment according to another embodiment.

FIG. 5B is a data structure diagram of an embodiment USD 550 similar to the USD 500 illustrated in FIG. 5A, except that in USD 550 the one or more delivery method/context elements 508 may be separated from the application service fragment 502 such that the application service fragment 502 are both separate child elements of the USD 550. For example, the delivery method/context elements 508 may be listed under the "deliveryMethod" child element of the USD 550.

Figure 6:
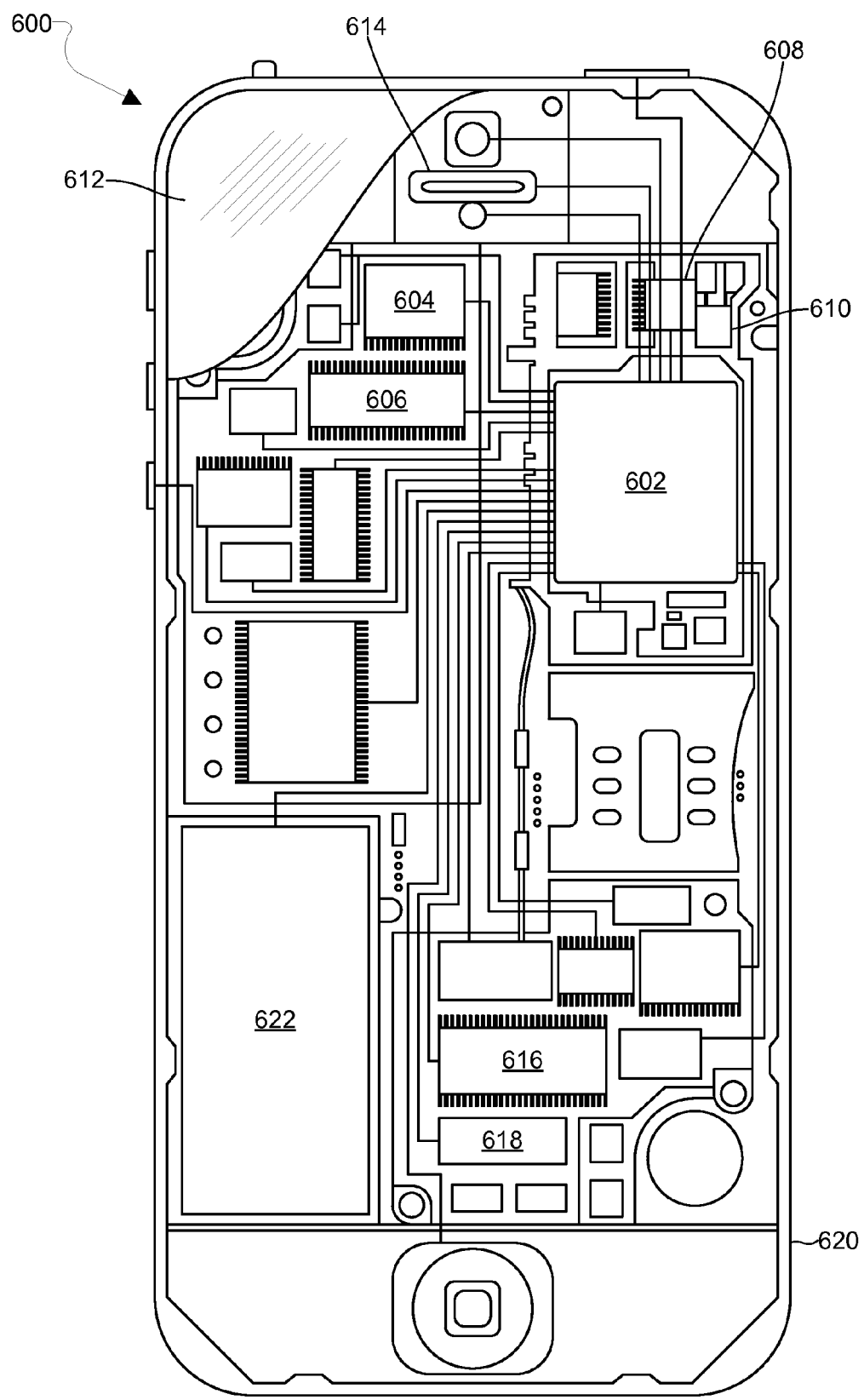
FIG. 6 is a component diagram of an example mobile device suitable for use with the various embodiments.

The various embodiments may be implemented in any of a variety of receiver devices, an example of which is illustrated in FIG. 6. For example, the mobile device 600 may include a processor 602 coupled to internal memories 604 and 606. Internal memories 604 and 606 may be volatile or non-volatile memories, and may also be secure and/or encrypted memories, or unsecure and/or unencrypted memories, or any combination thereof. The processor 602 may also be coupled to a touch screen display 612, such as a resistive-sensing touch screen, capacitive-sensing touch screen infrared sensing touch screen, or the like. Additionally, the display of the receiver device 600 need not have touch screen capability. The receiver device 600 may have one or more radio signal transceivers 608 (e.g., Peanut®, Bluetooth®, Zigbee®, Wi-Fi, RF radio) and antennae 610, for sending and receiving, coupled to each other and/or to the processor 602. The receiver device 600 may include a cellular network wireless modem chip 616 that enables communication via a cellular data network (e.g., CDMA, TDMA, GSM, PCS, 3G, 4G, LTE, or any other type of cellular data network) and is coupled to the processor 602. The receiver device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port. The receiver device 600 may also include speakers 614 for providing audio outputs. The receiver device 600 may also include a housing 620, constructed of a plastic, metal, or a combination of materials, for containing all or some of the components discussed herein. The receiver device 600 may include a power source 622 coupled to the processor 602, such as a disposable or rechargeable battery. The rechargeable battery may also be coupled to the peripheral device connection port to receive a charging current from a source external to the receiver device 600.

Figure 7:
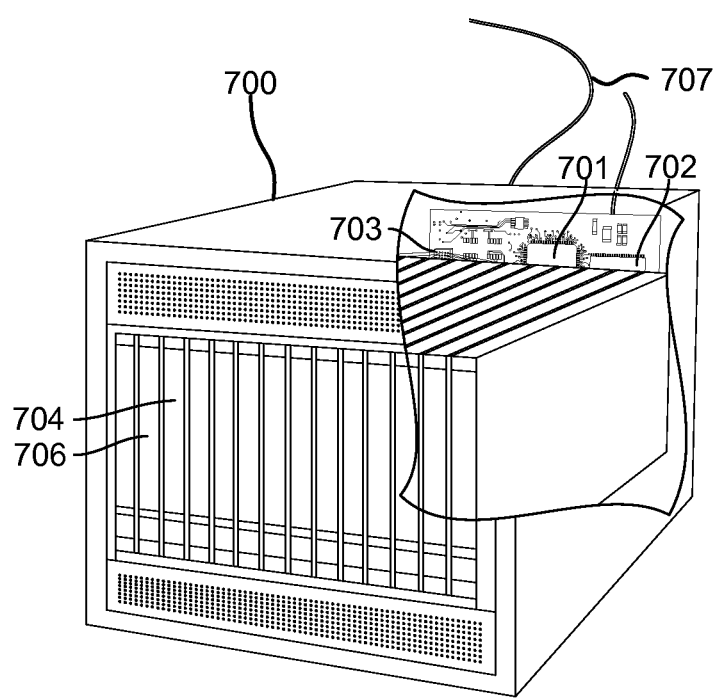
FIG. 7 is a component diagram of an example server suitable for use with the various embodiments.

The various embodiments may also be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 704. The server 700 may also include a floppy disc drive, compact disc (CD) or DVD disc drive 706 coupled to the processor 701. The server 700 may also include network access ports 703 coupled to the processor 701 for establishing network interface connections with a network 707, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 602 and 701 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 604, 606, 702, 704 before they are accessed and loaded into the processors 602 and 701. The processors 602 and 701 may include internal memory sufficient to store the application software instructions. In many devices the internal memory may be a volatile or nonvolatile memory, such as flash memory, or a mixture of both. For the purposes of this description, a general reference to memory refers to memory accessible by the processors 602 and 701 including internal memory or removable memory plugged into the device and memory within the processor 602 and 701 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for delivery of objects in a network, comprising:
   receiving an application service document at a receiver device the application service document indicating an application service entry point document location, two or more different delivery methods or contexts for one or more objects of an application service, and alternative content for the one or more objects of the application service;
   selecting, at the receiver device, a first delivery method or context of the two or more different delivery methods or contexts for the one or more objects of the application service based on the received application service document, a current service area, and a download policy;
   downloading the one or more objects over an MBMS network via the selected delivery method or context to the receiver device;
   determining, at the receiver device, whether download of the one or more objects was successful via the selected first delivery method or context;
   selecting, at the receiver device, a second delivery method or context of the two or more different delivery methods or contexts for the one or more objects of the application service based on the received application service document, the current service area, and the download policy in response to determining the download of the one or more objects was not successful via the selected first delivery method or context;
   downloading the one or more objects over the MBMS network via the selected second delivery method or context to the receiver device;
   determining, at the receiver device, whether download of the one or more objects was successful via the selected second delivery method or context;
   selecting, at the receiver device, the alternative content for the one or more objects of the application service to download in response to determining the download of the one or more objects was not successful via the selected second delivery method or context; and
   downloading the selected alternative content to the receiver device via the selected second delivery method or context to the receiver device.

2. The method of claim 1, wherein the two or more different delivery methods or contexts include one or more of an MBMS download delivery session, delivery as a metadata fragment of the user service description, and unicast delivery.

3. The method of claim 2, wherein the application service document further indicates a MIME type of the application service entry point.

4. The method of claim 2, wherein each indication of the two or more different delivery methods or contexts in the application service document includes one or more of an indication of a delivery type, a reference to a delivery service, a restricted service area, a group association, and a URL or regular expression pattern.

5. The method of claim 1, wherein selecting, at the receiver device, a first delivery method or context of the two or more different delivery methods or contexts for the one or more objects of the application service based on the received application service document, a current service area, and a download policy comprises selecting, at the receiver device, a first delivery method or context of the two or more different delivery methods or contexts for the one or more objects of the application service based on the received application service document, a current service area, a group association, and a download policy.

6. The method of claim 1, wherein the one or more objects corresponds to service announcement and discovery information.

7. The method of claim 6, wherein the service announcement and discovery information pertains to an application service fragment.

8. The method of claim 7, wherein:
   the application service is DASH, HTML, or Apple® HTTP Live Streaming;
   the one or more objects are a segment, image, style sheet, or MPD update; and
   the service announcement and discovery information is an MBMS User Service Description (USD).

9. A receiver device, comprising:
   means for receiving an application service document indicating an application service entry point document location and two or more different delivery methods or contexts for one or more objects of an application service;
   means for selecting a first delivery method or context of the two or more different delivery methods or contexts for the one or more objects of the application service based on the received application service document, a current service area, and a download policy; and
   means for downloading the one or more objects over an MBMS network via the selected first delivery method or context,
   wherein the application service document indicates alternative content for the one or more objects of the application service, and
   wherein the receiver device further comprises:
      means for determining whether download of the one or more objects was successful via the selected first delivery method or context;
      means for selecting a second delivery method or context of the two or more different delivery methods or contexts for the one or more objects of the application service based on the received application service document, the current service area, and the download policy in response to determining the download of the one or more objects was not successful via the selected first delivery method or context;
      means for downloading the one or more objects over the MBMS network via the selected second delivery method or context;
      means for determining whether download of the one or more objects was successful via the selected second delivery method or context;
      means for selecting the alternative content for the one or more objects of the application service to download in response to determining the download of the one or more objects was not successful via the selected second delivery method or context; and
      means for downloading the selected alternative content via the selected second delivery method or context.

10. The receiver device of claim 9, wherein means for selecting a first delivery method or context of the two or more different delivery methods or contexts for the one or more objects of the application service based on the received application service document, a current service area, and a download policy comprises means for selecting a first delivery method or context of the two or more different delivery methods or contexts for the one or more objects of the application service based on the received application service document, a current service area, a group association, and a download policy.

11. The receiver device of claim 9, wherein the two or more different delivery methods or contexts include one or more of an MBMS download delivery session, delivery as a metadata fragment of the user service description, and unicast delivery.

12. The receiver device of claim 9, wherein the application service document indicating the application service entry point document location and two or more different delivery methods or contexts for one or more objects of the application service comprises an application service document indicating an application service entry point document location, a MIME type of the application service entry point, and two or more different delivery methods or contexts for one or more objects of an application service.

13. The receiver device of claim 9, wherein each indication of the two or more different delivery methods or contexts in the application service document includes one or more of an indication of a delivery type, a reference to a delivery service, a restricted service area, a group association, and a URL or regular expression pattern.

14. The receiver device of claim 9, wherein the one or more objects corresponds to service announcement and discovery information.

15. The receiver device of claim 14, wherein the service announcement and discovery information pertains to an application service fragment.

16. The receiver device of claim 15, wherein:
the application service is DASH, HTML, or Apple® HTTP Live Streaming;
the one or more objects are a segment, image, style sheet, or MPD update; and
the service announcement and discovery information is an MBMS User Service Description (USD).

17. A receiver device, comprising:
a network interface; and
a processor connected to the network interface, wherein the processor is configured with processor executable instructions to perform operations comprising:
receiving an application service document indicating an application service entry point document location and two or more different delivery methods or contexts for one or more objects of an application service via the network interface;
selecting a first delivery method or context of the two or more different delivery methods or contexts for the one or more objects of the application service based on the received application service document, a current service area, and a download policy; and
downloading the one or more objects over an MBMS network via the selected first delivery method or context via the network interface,
wherein the application service document indicates alternative content for the one or more objects of the application service, and
wherein the processor is configured with processor executable instructions to perform operations further comprising:
determining whether download of the one or more objects was successful via the selected first delivery method or context;
selecting a second delivery method or context of the two or more different delivery methods or contexts for the one or more objects of the application service based on the received application service document, the current service area, and the download policy in response to determining the download of the one or more objects was not successful via the selected first delivery method or context;
downloading the one or more objects over the MBMS network via the selected second delivery method or context;
determining whether download of the one or more objects was successful via the selected second delivery method or context;
selecting the alternative content for the one or more objects of the application service to download in response to determining the download of the one or more objects was not successful via the selected second delivery method or context; and
downloading the selected alternative content via the network interface via the selected second delivery method or context via the network interface.

18. The receiver device of claim 17, wherein the processor is configured with processor executable instructions to perform operations such that selecting a first delivery method or context of the two or more different delivery methods or contexts for the one or more objects of the application service based on the received application service document, a current service area, and a download policy comprises selecting a first delivery method or context of the two or more different delivery methods or contexts for the one or more objects of the application service based on the received application service document, a current service area, a group association, and a download policy.

19. The receiver device of claim 17, wherein the two or more different delivery methods or contexts include one or more of an MBMS download delivery session, delivery as a metadata fragment of the user service description, and unicast delivery.

20. The receiver device of claim 17, wherein the application service document indicating the application service entry point document location and two or more different delivery methods or contexts for one or more objects of the application service comprises an application service document indicating an application service entry point document location, a MIME type of the application service entry point, and two or more different delivery methods or contexts for one or more objects of an application service.

21. The receiver device of claim 17, wherein each indication of the two or more different delivery methods or contexts in the application service document includes one or more of an indication of a delivery type, a reference to a delivery service, a restricted service area, a group association, and a URL or regular expression pattern.

22. The receiver device of claim 17, wherein the one or more objects corresponds to service announcement and discovery information.

23. The receiver device of claim 22, wherein the service announcement and discovery information pertains to an application service fragment.

24. The receiver device of claim 23, wherein:
the application service is DASH, HTML, or Apple® HTTP Live Streaming;
the one or more objects are a segment, image, style sheet, or MPD update; and
the service announcement and discovery information is an MBMS User Service Description (USD).

25. A non-transitory processor readable medium having stored thereon processor executable instructions configured to cause a processor to perform operations comprising:
receiving an application service document indicating an application service entry point document location and two or more different delivery methods or contexts for one or more objects of an application service;
selecting a first delivery method or context of the two or more different delivery methods or contexts for the one or more objects of the application service based on the received application service document, a current service area, and a download policy; and
downloading the one or more objects over an MBMS network via the selected first delivery method or context,
wherein the application service document indicates alternative content for the one or more objects of the application service, and
wherein the processor executable instructions are configured to cause a processor to perform operations further comprising:
determining whether download of the one or more objects was successful via the selected first delivery method or context;
selecting a second delivery method or context of the two or more different delivery methods or contexts for the one or more objects of the application service based on the received application service document, the current service area, and the download policy in response to determining the download of the one or more objects was not successful via the selected first delivery method or context;
downloading the one or more objects over the MBMS network via the selected second delivery method or context;
determining whether download of the one or more objects was successful via the selected second delivery method or context;
selecting the alternative content for the one or more objects of the application service to download in response to determining the download of the one or more objects was not successful via the selected second delivery method or context; and
downloading the selected alternative content via the selected second delivery method or context.

26. The non-transitory processor readable medium of claim 25, wherein the processor executable instructions are configured to cause a processor to perform operations such that selecting a first delivery method or context of the two or more different delivery methods or contexts for the one or more objects of the application service based on the received application service document, a current service area, and a download policy comprises selecting a first delivery method or context of the two or more different delivery methods or contexts for the one or more objects of the application service based on the received application service document, a current service area, a group association, and a download policy.

27. The non-transitory processor readable medium of claim 25, wherein the processor executable instructions are configured to cause a processor to perform operations such that the two or more different delivery methods or contexts include one or more of an MBMS download delivery session, delivery as a metadata fragment of the user service description, and unicast delivery.

28. The non-transitory processor readable medium of claim 25, wherein the processor executable instructions are configured to cause a processor to perform operations such that the application service document indicating the application service entry point document location and two or more different delivery methods or contexts for one or more objects of the application service comprises an application service document indicating an application service entry point document location, a MIME type of the application service entry point, and two or more different delivery methods or contexts for one or more objects of an application service.

29. The non-transitory processor readable medium of claim 25, wherein the processor executable instructions are configured to cause a processor to perform operations such that each indication of the two or more different delivery methods or contexts in the application service document includes one or more of an indication of a delivery type, a reference to a delivery service, a restricted service area, a group association, and a URL or regular expression pattern.

30. The non-transitory processor readable medium of claim 25, wherein the processor executable instructions are configured to cause a processor to perform operations such that the one or more objects corresponds to service announcement and discovery information.

31. The non-transitory processor readable medium of claim 30, wherein the processor executable instructions are configured to cause a processor to perform operations such that the service announcement and discovery information pertains to an application service fragment.

32. The non-transitory processor readable medium of claim 31, wherein the processor executable instructions are configured to cause a processor to perform operations such that:
the application service is DASH, HTML, or Apple® HTTP Live Streaming;
the one or more objects are a segment, image, style sheet, or MPD update; and
the service announcement and discovery information is an MBMS User Service Description (USD).

33. A system comprising:
a server, comprising:
means for generating an application service document indicating an application service entry point document location and two or more different delivery methods or contexts for one or more objects of an application service;
means for sending the application service document as part of service announcement and discovery information; and
means for delivering the one or more objects over an MBMS network via the two or more different delivery methods or contexts; and
a receiver device, comprising:
means for receiving the application service document;
means for selecting a first delivery method or context of the two or more different delivery methods or contexts for the one or more objects of the application service based on the received application service document, a current service area, and a download policy; and
means for downloading the one or more objects over the MBMS network via the selected first delivery method or context,
wherein the application service document indicates alternative content for the one or more objects of the application service, and wherein the receiver device further comprises:
means for determining whether download of the one or more objects was successful via the selected first delivery method or context;
means for selecting a second delivery method or context of the two or more different delivery methods or contexts for the one or more objects of the application service based on the received application service document, the current service area, and the download policy in response to determining the download of the one or more objects was not successful via the selected first delivery method or context;
means for downloading the one or more objects over the MBMS network via the selected second delivery method or context;
means for determining whether download of the one or more objects was successful via the selected second delivery method or context;
means for selecting the alternative content for the one or more objects of the application service to download in response to determining the download of the one or more objects was not successful via the selected second delivery method or context; and
means for downloading the selected alternative content via the selected second delivery method or context.

34. The system of claim 33, wherein the two or more different delivery methods or contexts include one or more of an MBMS download delivery session, delivery as a metadata fragment of the user service description, and unicast delivery.

35. The system of claim 34, wherein means for generating an application service document indicating an application service entry point document location and two or more different delivery methods or contexts for one or more objects of an application service comprises means for generating an application service document indicating an application service entry point document location, a MIME type of the application service entry point, and two or more different delivery methods or contexts for one or more objects of an application service.

36. The system of claim 34, wherein each indication of the two or more different delivery methods or contexts in the application service document includes one or more of an indication of a delivery type, a reference to a delivery service, a restricted service area, a group association, and a URL or regular expression pattern.

37. The system of claim 33, wherein means for selecting a first delivery method or context of the two or more different delivery methods or contexts for the one or more objects of the application service based on the received application service document, a current service area, and a download policy comprises means for selecting a first delivery method or context of the two or more different delivery methods or contexts for the one or more objects of the application service based on the received application service document, a current service area, a group association, and a download policy.

38. The system of claim 33, wherein the one or more objects corresponds to service announcement and discovery information.

39. The system of claim 38, wherein the service announcement and discovery information pertains to an application service fragment.

40. The system of claim 39, wherein:
the application service is DASH, HTML, or Apple® HTTP Live Streaming;
the one or more objects are a segment, image, style sheet, or MPD update; and
the service announcement and discovery information is an MBMS User Service Description (USD).

41. A system comprising:
a server, comprising:
a server network interface; and
a server processor connected to the server network interface, wherein the server processor is configured with processor executable instructions to perform operations comprising:
generating an application service document indicating an application service entry point document location and two or more different delivery methods or contexts for one or more objects of an application service;
sending the application service document as part of service announcement and discovery information via the server network interface; and
delivering the one or more objects over an MBMS network via the two or more different delivery methods or contexts via the server network interface; and
a receiver device, comprising:
a receiver device network interface;
a receiver device processor connected to the receiver device network interface, wherein the receiver device processor is configured with processor executable instructions to perform operations comprising:
receiving the application service document via the receiver device network interface;
selecting a first delivery method or context of the two or more different delivery methods or contexts for the one or more objects of the application service based on the received application service document, a current service area, and a download policy; and
downloading the one or more objects over the MBMS network via the selected first delivery method or context via the receiver device network interface,
wherein the application service document indicates alternative content for the one or more objects of the application service, and
wherein the receiver device processor is configured with processor executable instructions to perform operations further comprising:
determining whether download of the one or more objects was successful via the selected first delivery method or context;
selecting a second delivery method or context of the two or more different delivery methods or contexts for the one or more objects of the application service based on the received application service document, the current service area, and the download policy in response to determining the download of the one or more objects was not successful via the selected first delivery method or context;
downloading the one or more objects over the MBMS network via the selected second delivery method or context;
determining whether download of the one or more objects was successful via the selected second delivery method or context;
selecting the alternative content for the one or more objects of the application service to download in response to determining the download of the one or more objects was not successful via the selected second delivery method or context; and downloading the selected alternative content via the selected second delivery method or context via the receiver device network interface.

42. The system of claim 41, wherein the two or more different delivery methods or contexts include one or more of an MBMS download delivery session, delivery as a metadata fragment of the user service description, and unicast delivery.

43. The system of claim 42, wherein the server processor is configured with processor executable instructions to perform operations such that generating an application service document indicating an application service entry point document location and two or more different delivery methods or contexts for one or more objects of an application service comprises generating an application service document indicating an application service entry point document location, a MIME type of the application service entry point, and two or more different delivery methods or contexts for one or more objects of an application service.

44. The system of claim 42, wherein each indication of the two or more different delivery methods or contexts in the application service document includes one or more of an indication of a delivery type, a reference to a delivery service, a restricted service area, a group association, and a URL or regular expression pattern.

45. The system of claim 41, wherein the receiver device processor is configured with processor executable instructions to perform operations such that selecting a first delivery method or context of the two or more different delivery methods or contexts for the one or more objects of the application service based on the received application service document, a current service area, and a download policy comprises selecting a first delivery method or context of the two or more different delivery methods or contexts for the one or more objects of the application service based on the received application service document, a current service area, a group association, and a download policy.

46. The system of claim 41, wherein the one or more objects corresponds to service announcement and discovery information.

47. The system of claim 46, wherein the service announcement and discovery information pertains to an application service fragment.

48. The system of claim 47, wherein:
the application service is one of DASH, HTML, or Apple® HTTP Live Streaming;
the one or more objects are a segment, image, style sheet, or MPD update; and
the service announcement and discovery information is an MBMS User Service Description (USD).

* * * * *